(12) United States Patent  
Konig et al.

(10) Patent No.: US 8,825,853 B1  
(45) Date of Patent: *Sep. 2, 2014

(54) AUTOMATIC, PERSONALIZED ONLINE INFORMATION AND PRODUCT SERVICES

(71) Applicants: Yochai Konig, San Francisco, CA (US); Roy Twersky, San Francisco, CA (US); Michael R Berthold, Berkeley, CA (US)

(72) Inventors: Yochai Konig, San Francisco, CA (US); Roy Twersky, San Francisco, CA (US); Michael R Berthold, Berkeley, CA (US)

(73) Assignee: Personalized User Model, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,115

(22) Filed: May 31, 2013

Related U.S. Application Data

(63) Continuation of application No. 13/619,427, filed on Sep. 14, 2012, which is a continuation of application No. 12/692,252, filed on Jan. 22, 2010, now Pat. No. 8,301,764, which is a continuation of application No. 12/008,148, filed on Jan. 8, 2008, now Pat. No. 7,685,276, which is a continuation of application No. 11/316,785, filed on Dec. 22, 2005, now Pat. No. 7,320,031, which is a continuation of application No. 09/597,975, filed on Jun. 20, 2000, now Pat. No. 6,981,040.

(60) Provisional application No. 60/173,392, filed on Dec. 28, 1999.

(51) Int. Cl.
*G06F 15/173* (2006.01)

(52) U.S. Cl.
USPC .... 709/224; 709/223; 709/228; 707/E17.109; 715/736

(58) Field of Classification Search
CPC ................................ G06F 17/30867
USPC .......... 709/202–203, 223–228; 715/736–743; 707/E17.107–E17.109
See application file for complete search history.

(56) References Cited

U.S. PATENT DOCUMENTS 5,704,017 A 12/1997 Heckerman et al.
5,704,317 A 1/1998 Barth
(Continued)

OTHER PUBLICATIONS

"U.S. Appl. No. 09/597,975, Response filed Mar. 4, 2004 to Non Final Office Action mailed Jan. 29, 2004", 11 pgs.

(Continued)

*Primary Examiner* — Bharat N Barot
(74) *Attorney, Agent, or Firm* — Schwegman, Lundberg & Woessner, P.A.

(57) ABSTRACT

A method for providing automatic, personalized information services to a computer user includes the following steps: transparently monitoring user interactions with data during normal use of the computer; updating user-specific data files including a set of user-related documents; estimating parameters of a learning machine that define a User Model specific to the user, using the user-specific data files; analyzing a document to identify its properties; estimating the probability that the user is interested in the document by applying the document properties to the parameters of the User Model; and providing personalized services based on the estimated probability. Personalized services include personalized searches that return only documents of interest to the user, personalized crawling for maintaining an index of documents of interest to the user; personalized navigation that recommends interesting documents that are hyperlinked to documents currently being viewed; and personalized news, in which a third party server customized its interaction with the user.

19 Claims, 19 Drawing Sheets

(56) References Cited

U.S. PATENT DOCUMENTS

| | | | |
|---|---|---|---|
| 5,754,939 A | 5/1998 | Herz et al. | |
| 5,867,799 A | 2/1999 | Lang et al. | |
| 5,918,014 A | 6/1999 | Robinson | |
| 5,933,827 A | 8/1999 | Cole et al. | |
| 5,964,839 A | 10/1999 | Johnson et al. | |
| 5,983,214 A | 11/1999 | Lang et al. | |
| 5,991,735 A | 11/1999 | Gerace | |
| 5,999,975 A | 12/1999 | Kittaka et al. | |
| 6,006,218 A | 12/1999 | Breese et al. | |
| 6,029,161 A | 2/2000 | Lang et al. | |
| 6,029,195 A | 2/2000 | Herz | |
| 6,041,311 A | 3/2000 | Chislenko et al. | |
| 6,182,068 B1 | 1/2001 | Culliss | |
| 6,182,133 B1 | 1/2001 | Horvitz | |
| 6,230,204 B1 | 5/2001 | Fleming, III | |
| 6,460,036 B1 | 10/2002 | Herz | |
| 6,564,170 B2 | 5/2003 | Halabieh | |
| 6,567,797 B1 | 5/2003 | Schuetze et al. | |
| 6,567,850 B1 | 5/2003 | Freishtat et al. | |
| 6,606,620 B1 | 8/2003 | Sundaresan et al. | |
| 6,647,425 B1 | 11/2003 | Chaddha | |
| 6,687,696 B2 | 2/2004 | Hofmann et al. | |
| 6,697,824 B1 | 2/2004 | Bowman-Amuah | |
| 6,732,090 B2 | 5/2004 | Shanahan et al. | |
| 6,828,992 B1 | 12/2004 | Freeman et al. | |
| 6,915,482 B2 | 7/2005 | Jellum et al. | |
| 6,981,040 B1* | 12/2005 | Konig et al. | 709/224 |
| 7,127,476 B2* | 10/2006 | Narahara | 707/E17.109 |
| 7,308,497 B2 | 12/2007 | Louviere et al. | |
| 7,320,031 B2 | 1/2008 | Konig et al. | |
| 7,353,246 B1 | 4/2008 | Rosen et al. | |
| 7,631,032 B1 | 12/2009 | Refuah et al. | |
| 7,685,276 B2* | 3/2010 | Konig et al. | 709/224 |
| 8,301,764 B2 | 10/2012 | Konig et al. | |
| 2003/0051212 A1* | 3/2003 | Narahara | 715/511 |
| 2004/0015490 A1* | 1/2004 | Snyder et al. | 707/3 |
| 2008/0114756 A1 | 5/2008 | Konig et al. | |
| 2010/0122178 A1 | 5/2010 | Konig et al. | |
| 2013/0073390 A1 | 3/2013 | Konig et al. | |

OTHER PUBLICATIONS

"U.S. Appl. No. 09/597,975, Response filed Aug. 4, 2005 to Non Final Office Action mailed Jul. 8, 2005", 7 pgs.
"U.S. Appl. No. 09/597,975, Response filed Sep. 1, 2004 to Final Office Action mailed Jun. 4, 2004", 6 pgs.
"U.S. Appl. No. 09/597,975, Response filed Sep. 4, 2003 to Non Final Office Action mailed Jun. 4, 2003", 10 pgs.
"U.S. Appl. No. 09/597,975, Response filed Dec. 22, 2004 to Non Final Office Action mailed Nov. 17, 2004", 24 pgs.
"U.S. Appl. No. 11/316,785, Response filed Feb. 15, 2007 to Non Final Office Action mailed Aug. 22, 2006", 1 pg.
"U.S. Appl. No. 12/008,148, Non Final Office Action mailed Dec. 24, 2008", 5 pgs.
"U.S. Appl. No. 12/008,148, Notice of Allowance mailed Sep. 21, 2009", 6 pgs.
"U.S. Appl. No. 12/008,148, Notice of Allowance mailed Nov. 3, 2009", 6 pgs.
"U.S. Appl. No. 12/692,252, Examiner Interview Summary mailed Jun. 8, 2012", 3 pgs.
"U.S. Appl. No. 12/692,252, Non Final Office Action Mailed Dec. 8, 2011", 10 pgs.
"U.S. Appl. No. 12/692,252, Notice of Allowance mailed Aug. 3, 2012", 8 pgs.
"U.S. Appl. No. 12/692,252, Preliminary Amendment filed Mar. 17, 2010", 6 pgs.
"U.S. Appl. No. 12/692,252, Response filed Jun. 6, 2012 to Non Final Office Action mailed Dec. 8, 2011", 13 pgs.
"U.S. Appl. No. 12/692,252, Response Filed Sep. 27, 2011 to Restriction Requirement Received Sep. 2, 2011", 14 pgs.
"U.S. Appl. No. 12/692,252, Restriction Requirement Received Sep. 2, 2011", 5 pgs.
"U.S. Appl. No. 12/692,252, Supplemental Preliminary Amendment filed Mar. 25, 2010", 20 pgs.
"U.S. Appl. No. 13/619,427, Response filed May 15, 2013 to Restriction Requirement mailed Apr. 15, 2013", 9 pgs.
"U.S. Appl. No. 13/619,427, Restriction Requirement mailed Apr. 15, 2013", 5 pgs.
"U.S. Appl. No. 95/001,569, Decision on Request for Reexamination Received May 31, 2011", 15 pgs.
"U.S. Appl. No. 95/001,569, Inter Partes Reexamination Action Received May 31, 2011", 41 pgs.
"Request for Inter Partes Reexamination", Request for reexam on patent No. 7,685,276, Includes all exhibits mentioned in request, (Jul. 29, 2011), 576 pgs.
Basset, et al., "A Study of Generalization Techniques in Evolutionary Rule Learning", Paper, (2002), 90 pgs.
Edwards, Peter, et al., "Experience with Learning Agents which Manage Internet-Based Information", AAAI Technical Reports SS-96-05, (1996), 10 pgs.
Green, Claire L, et al., "Towards Practical Interface Agents which Manage Internet-Based Information", Intelligent Agents Workshop, BCS Specialist Group on Expert Systems and Representation & Reasoning Special Interest Group, [Online]. Retrieved from the Internet: <URL: http://citeseerx.ist.psu.edu/viewdoc/summary?doi=10.1.1.45.4212>, (1995), 14 pgs.
Joachims, Thorsten, et al., "WebWatcher: A Tour Guide for the World Wide Web", Proceedings of the 1997 IJCAI, (Aug. 1997), 6 pgs.
Lecun, Yann, "Machine Learning and Pattern Recognition", lecture presented at the Courant Institute, New York University, (2004).
Mladeic, Dunja, et al., "Personal WebWatcher: design and implementation", [Online]. Retrieved from the Internet: <URL: http://citeseerx.ist.psu.edu/viewdoc/summary?doi=10.1.1.49.2143>, (1996), 18 pgs.
Mobasher, B., "Automatic personalization based on web usage mining", [Online]. Retrieved from the Internet: <URL: http://maya.cs.depaul.edu/~mobasher/personalization>, 25 pgs.
Payne, Terry R, et al., "Experience with Rule Induction and k-Nearest Neighbor Methods for Interface Agents that Learn", IEEE Transactions on Knowledge and Data Engineering vol. 9, No. 2, (Mar. 1997), 7 pgs.
Payne, Terry R., et al., "Learning Mechanisms for Information Filtering Agents", [Online]. Retrieved from the Internet: <URL: http://citeseerx.ist.psu.edu/viewdoc/summary?doi=10.1.1.49.4026>, (1995), 14 pgs.
Wasfi, Ahmad M. Ahmad, "Collecting User Access Patterns for Building User Profiles and Collaborative Filtering", Proceedings of the 4th international conference on Intelligent user interfaces, (1998), 57-65.
Yang, Yiming, "Expert Network: Effective and efficient learning form human decisions in tex categorization and retrieval", in Proceedings of the Seventeenth Annual International Acm Sigir Conference on Research and Development in Information Retrieval, (1994), 13-22.
"U.S. Appl. No. 13/619,427, Non Final Office Action mailed Aug. 15, 2013", 8 pgs.
"U.S. Appl. No. 13/619,427, Notice of Allowance mailed Oct. 29, 2013", 7 pgs.
"U.S. Appl. No. 13/619,427, Response filed Aug. 8, 2013 to Non Final Office Action mailed Aug. 15, 2013", 8 pgs.
"U.S. Appl. No. 13/619,427, Response filed Oct. 8, 2013 to Non Final Office Action mailed Aug. 15, 2013", 8 pgs.
"U.S. Appl. No. 95/001,699, Response After Non-Final Action-Owner Timely Applicant filed Dec. 23, 2011", 53 pgs.
"U.S. Appl. No. 95/001,699, Third Party Requester Comments After Non-Final Action filed Jan. 23, 2012", 41 pgs.
"U.S. Appl. No. 95/001,699, Action Closing Prosecution (Non-Final) mailed on Feb. 10, 2012", 233 pgs.
"U.S. Appl. No. 95/001,699, Patent Owner Comments After Action Closing filed Mar. 12, 2012", 38 pgs.
"U.S. Appl. No. 95/001,699, Third Party Requester Comments After Action Closing Prosecution filed Apr. 10, 2012", 30 pgs.
"U.S. Appl. No. 95/001,699, Right of Appeal Notice mailed on Aug. 17, 2012", 90 pgs.

(56) References Cited

OTHER PUBLICATIONS

"U.S. Appl. No. 95/001,699, Notice of Appeal Notice filed Sep. 17, 2012", 2 pgs.
"U.S. Appl. No. 95/001,699, Appeal Brief-Owner filed Nov. 19, 2012", 44 pgs.
"U.S. Appl. No. 95/001,699, Respondent Brief-Requester filed Dec. 17, 2012", 30 pgs.
Supplemental Invalidity Chart for Letizia (C-15) to Google's Fourth Supplemental Responses to PUM's First Set of Interrogatories; Claim Chart of Letizia, 30 pages.
Supplemental Invalidity Chart for Payne (C-6) to Google's Fourth Supplemental Responses to PUM's First Set of Interrogatories; Payne et al., "Experience with Rule Induction and k-Nearest Neighbor Methods for Interface Agents that Learn," 1997, 30 pages.
Supplemental Invalidity Chart for Payne II (C-7) to Google's Fourth Supplemental Responses to PUM's First Set of Interrogatories; Payne et al., "Learning Mechanisms for Information Filtering Agents," 1995, 30 pages.
Supplemental Invalidity Chart for Personal WebWatcher (C-5) to Google's Fourth Supplemental Responses to PUM's First Set of Interrogatories; Claim Chart of Personal WebWatcher, 26 pages.
Supplemental Invalidity Chart for Refuah (C-8) to Google's Fourth Supplemental Responses to PUM's First Set of Interrogatories; Claim Chart of U.S. Patent No. 7,631,032 to Refuah et al, 40 pages.
Supplemental Invalidity Chart for Schuetze (C-9) to Google's Fourth Supplemental Responses to PUM's First Set of Interrogatories; Claim Chart of U.S. Patent No. 6,567,797, 33 pages.
Supplemental Invalidity Chart for Tan (C-11) to Google's Fourth Supplemental Responses to PUM's First Set of Interrogatories; Claim Chart of Ah-Hwee Tan, Christine Teo, Learning User Profiles for Personalized Information Dissemination, 25 pages.
Supplemental Invalidity Chart for Wasfi (C-10) to Google's Fourth Supplemental Responses to PUM's First Set of Interrogatories; Ahmad M. Ahmad Wasfi, "Collecting User Access Patterns for building User Profiles and Collaborative Filtering," Proceedings of the 4th International Conference on Intelligent User interfaces, Jan. 1999, 27 pages.
Supplemental Invalidity Chart for WebWatcher (C-4) to Google's Fourth Supplemental Responses to PUM's First Set of Interrogatories; Claim Chart of WebWatcher, 31 pages.
Google's Fourth Supplemental Objections and Responses to Plaintiffs First Set of Interrogatories (No. 13), 82 pages.
Invalidity Chart for Asnicar (C-16) to Google's Fourth Supplemental Responses to PUM's First Set of Interrogatories; Claim Chart of Asnicar et al., "ifWeb: A Prototype of User Model-Based Intelligent Agent for Document Filtering and Navigation in the World Wide Web," Proceedings of the Workship 'Adaptive Systems and User Modeling on the World Wide Web, 1997, 25 pages.
Invalidity Chart for Barrett (C-17) to Google's Fourth Supplemental Responses to Pum's First Set of Interrogatories; Claim Chart of Barrett et al., "How to Personalize the Web," IBM Almaden Research Center Publication, 1997, 25 pages.
Invalidity Chart for Montebello (C-19) to Google's Fourth Supplemental Responses to PUM's First Set of Interrogatories; Claim Chart of M. Montebello, W.A. Gray, S. Hurley, A Personal Evolvable Advisor for WWW Knowledge-Based Systems, 21 pages.
Invalidity Chart for Sakagami (C-20) to Google's Fourth Supplemental Responses to PUM's First Set of Interrogatories; Claim Chart of Hidekazu Sakagami, Tomonari Kamba, Learning Personal Preferences on Online Newspaper Articles from User Behaviors; 20 pages.
Invalidity Chart for Stefani (C-18) to Google's Fourth Supplemental Responses to PUM's First Set of Interrogatories; Claim Chart of Anna Stefani and Carlo Strapparava, Personalizing Access to Web Sites: The SiteIF Project, Proceedings of the 2nd Workshop on Adaptive Hypertext and Hypermedia HYPERTEXT'98, Pittsburgh, USA, Jun. 20-24, 1998, 22 pages.
Supplemental Invalidity Chart for Autonomy (C-14) to Google's Fourth Supplemental Responses to PUM's First Set of Interrogatories; Claim Chart of Autonomy's Agentware, 28 pages.
Supplemental Invalidity Chart for Culliss (C-1) to Google's Fourth Supplemental Responses to PUM's First Set of Interrogatories; Claim Chart of U.S. Patent No. 6,182,068 to Culliss, 30 pages.
Wasfi, Ahmad M. Ahmad, Collecting User Access Patterns for Building User Profiles and Collaborative Filtering, School of Computer Sciences, University of Science, Malaysia; Penang 11800, Malaysia, 8 pages.
Tan, Ah-Hwee et al, Learning User Profiles for Personalized Information Dissemination, Kent Ridge Digital Labs, 21 Heng Mui Keng Terrace, Singapore 119613, 6 pages.
Hofferer, Max, et al., An Evolutionary Approach to Intelligent Information Filtering, Institute of Applied Computer Science and Information Systems, University of Vienna, Liebiggasse 4/3, A-1010 Vienna, Austria, 6 pages.
Kamba, Tomonari et al., The Krakatoa Chronicle—An Interactive, Personalized, Newspaper on the Web, http://www.w3.org/ConferencesNVWW4/Papers/93/, Sep. 8, 2010, 11 pages.
Autonomy, Autonomy Releases the First Intelligent Internet Software to Deliver Personalized Information on Demand; Los Angeles, California at Internet World Today, Autonomy, Inc., Mar. 10, 1997, 3 pages.
Lieberman, Henry, Letizia: An Agent That Assists Web Browsing, Media Laboratory, Massachusetts Institute of Technology, Cambridge, MA, USA, 6 pages.
Asnicar, Fabio A et al., ifWeb: a Prototype of User Model-Based Intelligent Agent for Document Filtering and Navigation in the World Wide Web, Proceedings of the workshop "Adaptive Systems and User Modeling on the World Wide Web", Sixth International Conference on User Modeling, Chia Laguna, Sardinia, Jun. 2-5, 1997, 7 pages.
Barret, Rob et al. How to Personalize the Web, IBM Almaden Research Center, 650 Harry Road, San Jose, California 95120, http://www.almaden.ibm.com/cs/wbi/papers/chi97/wbipaper.html, Apr. 27, 2011, 13 pages.
Stefani, Anna et al, Personalizing Access to Web Sites: The SiteIF Project, Proceedings of the 2nd Workshop on Adaptive Hypertext and Hypermedia HYPERTEXT98, Pittsburgh, USA, Jun. 20-24, 1998, 7 pages.
Montebello, M. et al., A Personal Evolvable Advisor for WWW Knowledge-Based Systems, http://www-rocq.inria.fr/—vercoust/REUSE/pos7/; Apr. 27, 2011, 7 pages.
Edwards, et al., Experience with Learning Agents which Manage Internet-Based Information, from: AAAI Technical Report SS-96-05. Compilation copyright 1996, AAAI (www.aaai.org), 10 pages.
Sakagami, Hidekazu et al., Learning Personal Preferences on Online Newspaper Articles from User Behavior, www.ra.ethz.ch/CDstore/www6/Technical/Paper142.html, Apr. 27, 2011, 10 pages.
Green, Claire L. et al., Towards Practical Interface Agents which Manage Internet-Based Information, Department of Computing Science, King's College, University of Aberdeen, Aberdeen, Scotland, AB9 2UE, 14 pages.
Joachims, Thorsten et al., WebWatcher: A Tour Guide for the World Wide Web, Universitat DortmUnd, Informatik-LS8, Baroper Str. 301, 44221 Dortmund Germany and Carnegie Mellon University, School of Computer Science, 5000 Forbes Avenue, Pittsburgh, Pennsylvania 15213, 6 pages.
Mladenic, Dunja, Personal WebWatcher: design and implementation, Dpt. for Intelligent Systems, J. Stefan Institute, Jamova 39, 11000 Ljubljana, Slovenia, School of Computer Science, Carnegie Mellon University, Pittsburgh, Pennsylvania, 18 pages.
Payne, Terry R. et al., Experience with Rule Induction and k-Nearest Neighbor Methods for Interface Agents that Learn, IEEE Transactions on Knowledge and Data Engineering, Col. 9, No. 2, Mar.-Apr. 1997, 7 pages.
Payne, Terry R. et al, Learning Mechanisms for Information Filtering Agents, Department of Computing Science, King's College, University of Aberdeen, Aberdeen, Scotland, AB9 2UE, 6 pages.
*Personalized User Model LLP V. Google Inc.*, Civ. No. 09-525-LPS, Claims Construction Opinion, USDC D.DEL, Jan. 25, 2012 (Unsealed Jan. 26, 2012).
*Personalized User Model LLP v. Google Inc.*, Civ, No. 09-525 (LPS), Memorandum Opinion (Redacted Version), United States District Court for the District of Delaware, Sep. 16, 2013; 21pages.

(56) References Cited

OTHER PUBLICATIONS

Yang, Yiming, "Expert Network: Effective and efficient learning from human decisions in text categorization and retrieval", in Proc. Seventeenth Ann. Intl. ACM SIGIR Conference on Research and Development in Information Retrieval, pp. 13-22 (1994).
U.S. Appl. No. 12/692,252, Non Final Office Action mailed Dec. 8, 2011, 14 pages.
Reexamination Control No. 95/001,569 Decision on Request for Reexamination mailed May 27, 2011, 15 pages.
*Personalized User Model LLP* v. *Google Inc.*, Civ, No. 09-525 (JJP), Videotaped Deposition of Michael I. Jordan, PhD, United States District Count for the District of Delaware, Nov. 7, 2012; 459 pages.
*Personalized User Model LLP* v. *Google Inc.*, Civ, No. 09-525 (LPS), Videotaped Deposition of Jaime Carbonell, United States District Count for the District of Delaware, Nov. 27, 2012; 348 pages.
Mobasher, B., "Automatic personalization based on web usage mining," [Online]. Retrieved from the Internet: <http://maya.cs.depaul.edu/~mobasher/personalization>, 10 pgs.
Yann LeCun (2005) in a lecture entitled "Machine Learning and Pattern Recognition" and presented at The Courant Institute, New York University, 15 pgs.
Basset et al. (2002) in a paper entitled "A Study of Generalization Techniques in Evolutionary Rule Learning," 90 pgs.
"U.S. Appl. No. 09/597,975, Examiner Interview Summary mailed Dec. 11, 2003", 2 pgs.
"U.S. Appl. No. 09/597,975, Final Office Action mailed Jun. 4, 2004", 32 pgs.
"U.S. Appl. No. 09/597,975, Final Office Action mailed Dec. 3, 2003", 17 pgs.
"U.S. Appl. No. 09/597,975, Non Final Office Action mailed Jan. 29, 2004", 25 pgs.
"U.S. Appl. No. 09/597,975, Non Final Office Action mailed Jun. 4, 2003", 13 pgs.
"U.S. Appl. No. 09/597,975, Non Final Office Action mailed Jul. 8, 2005", 14 pgs.
"U.S. Appl. No. 09/597,975, Non Final Office Action mailed Nov. 17, 2004", 30 pgs.
"U.S. Appl. No. 09/597,975, Notice of Allowance mailed Sep. 22, 2005", 3 pgs.
"U.S. Appl. No. 09/597,975, Response filed Mar. 8, 2004 to Non Final Office Action mailed Jan. 29, 2004", 11 pgs.
"U.S. Appl. No. 09/597,975, Response filed Aug. 8, 2005 to Non Final Office Action mailed Jul. 8, 2005", 8 pgs.
"U.S. Appl. No. 09/597,975, Response filed Sep. 7, 2004 to Final Office Action mailed Jun. 4, 2004", 7 pgs.
"U.S. Appl. No. 09/597,975, Response filed Sep. 8, 2003 to Non Final Office Action mailed Jun. 4, 2003", 11 pgs.
"U.S. Appl. No. 09/597,975, Response filed Dec. 16, 2003 to Final Office Action mailed Dec. 3, 2003", 6 pgs.
"U.S. Appl. No. 09/597,975, Response filed Dec. 28, 2004 to Non Final Office Action mailed Nov. 17, 2004", 24 pgs.
"U.S. Appl. No. 11/316,785, Non Final Office Action mailed Aug. 22, 2006", 7 pgs.
"U.S. Appl. No. 11/316,785, Notice of Allowance mailed Aug. 27, 2007", 3 pgs.
"U.S. Appl. No. 11/316,785, Response filed Feb. 21, 2007 to Non Final Office Action mailed Aug. 22, 2006", 3 pgs.
Pretschner, Alexander, "Ontology Based Personalized Search", Master's Thesis, Department of Electrical Engineering and Computer Science, University of Kansas, (1998), 125 pgs.
"U.S. Appl. No. 12/008,148 Non Final Office Action mailed Dec. 24, 2008", 5 pgs.
"U.S. Appl. No. 12/008,148, Response filed Jun. 19, 2009 to Non Final Office Action mailed Dec. 24, 2008", 9 pgs.
"U.S. Appl. No. 12/008,148, Notice of Allowance mailed Sep. 21, 2009", 4 pgs.
"U.S. Appl. No. 12/008,148, Notice of Allowance mailed Nov. 03, 2009", 4 pgs.
*Personalized User Model LLP* v. *Google Inc.*, Civ. No. 09-525-LPS, Rebuttal Expert Witness Report of Jaime G. Carbonell, USDC D. DEL, Sep. 28, 2012.
*Personalized User Model LLP* v. *Google Inc.*, Civ. No. 09-525-LPS, Report of Defendants' Expert Michael I. Jordan, Ph.D., Concerning Invalidity of Claims 1, 11, 22, 32, and 34 of U.S. Patent No. 6,981,040 and Claims 1, 3, 5, 6, 7, 21, and 22 of U.S. Patent No. 7,685,276, USDC D. DEL, Apr. 11, 2012.
*Personalized User Model LLP* v. *Google Inc.*, Civ. No. 09-525-LPS, Declaration of Jaime Carbonell, USDC D. DEL, Aug. 21, 2012.
Jaime Carbonell, Email Communication with Dunja Mladenic regarding Personal Web Watcher, Jun. 28, 2012.
Patent Owner'S Response to Action Closing Prosecution, Inter Partes Reexamination 95/001,569, May 21, 2012.
Declaration of Charles K. Nicholas Under 37 C.F.R. 1.132 and MPEP 2618(11), Inter Partes Reexamination 95/001,569, May 20, 2012.
"Pattern Recognition and Machine Learning," Christopher M. Bishop (2006), Springer ISBN 0-387-31073-8 (http:l/en.wikipedia.org/wiki/Machine_learning, May 19, 2012).
"Machine Learning and Pattern Recognition," Yann Lecun, New York University, Spring 2004.
Supplemental Invalidity Chart for Edwards (C-2) to Google's Fourth Supplemental Responses to PUM's First Set of Interrogatories; Edwards et al., "Experience with Learning Agents which Manage Internet-Based Information," 1996, 29 pages.
Supplemental Invalidity Chart for Green (C-3) to Google's Fourth Supplemental Responses to PUM's First Set of Interrogatories; Green et al., "Towards Practical Interface Agents which Manage Internet-Based Information," 1995, 32 pages.
Supplemental Invalidity Chart for Hofferer (C-12) to Google's Fourth Supplemental Responses to PUM's First Set of Interrogatories; Claim Chart of Max Hofferer, Bemd Knaus, and Werner Winiwarter, "An Evolutionary Approach to Intelligent Information Filtering," 28 pages.
Supplemental Invalidity Chart for Kamba (C-13) to Google's Fourth Supplemental Responses to PUM's First Set of Interrogatories; Claim Chart of Tomonari Kamba, Krishnan Bharat, and Michelle C. Albers, The Krakatoa Chronicle—An Interactive, Personalized Newspaper on the Web, 27 pages.
"U.S. Appl. No. 95/001,569, Receipt of Orig. Ex Parte Request by Third Party filed Mar. 7, 2011", 42 pgs.
"U.S. Appl. No. 95/001,569, Non-Final Office Action mailed May 27, 2011", 41 pages.
"U.S. Appl. No. 95/001,569, Response after Non-Final Action-Owner Timely Applicant filed Jul. 27, 2011", 41 pgs.
"U.S. Appl. No. 95/001,569, Affidavit/Decl/Exhibit Filed by Third Party filed Aug. 26, 2011", 10 pgs.
"U.S. Appl. No. 95/001,569, Third Party Requester Comments After Non-Final Action filed Aug. 26, 2011", 44 pgs.
"U.S. Appl. No. 95/001,569, Third Party Requester Comments After Non-Final Action filed Sep. 2, 2011", 44 pgs.
"U.S. Appl. No. 95/001,569, Information Disclosure Statement Filed by Third Party filed Feb. 7, 2012", 38 pgs.
"U.S. Appl. No. 95/001,569, Action Closing Prosecution (nonfinal) mailed Apr. 19, 2012", 87 pgs.
"U.S. Appl. No. 95/001,569, Patent Owner Comments After Action Closing Prosecution filed May 21, 2012", 41 pgs.
"U.S. Appl. No. 95/001,569, Third Party Requester Comments After Action Closing Prosecution filed Jun. 20, 2012", 32 pgs.
"U.S. Appl. No. 95/001,569, Right of Appeal Notice mailed Feb. 14, 2013", 63 pgs.
"U.S. Appl. No. 95/001,699, Patent for which Re-examination is Requested filed Jul. 29, 2011", 40 pgs.
"U.S. Appl. No. 95/001,699, Re-exam Non-Final Action mailed on Oct. 24, 2011", 23 pgs.

\* cited by examiner

Informative Word/Phrase List

| Word ID | Word Grade | Last Access Time | Number of Accesses |
|---|---|---|---|
| Vegan | 0.86 | 3/6/2000 12:22:41 | 173 |
| Parasail | 0.72 | 4/15/2000 18:51:27 | 220 |

*Fig. 4A*

Web Site Distribution

| Site ID | Site Probability | Last Access Time | Number of Accesses |
|---|---|---|---|
| herring.com | 0.61 | 5/1/2000 19:15:21 | 152 |
| Java.com | 0.43 | 4/24/2000 3:16:18 | 460 |

*Fig. 4B*

User Topic Distribution

| Topic ID | Topic Parent | Topic Probability | Last Access Time | Number of Accesses |
|---|---|---|---|---|
| Computers | Industries | 0.6 | 12/2/1999 1:21:22 | 74 |
| Publishing | Industries | 0.31 | 1/2/2000 6:25:31 | 62 |

*Fig. 4C*

User Product Distribution

| Product ID | Product Parent | Product Probability | Last Purchase Time | Number of Purchases | Last Access Time | Number of Accesses |
|---|---|---|---|---|---|---|
| 3Com Palm 3E | Without Keyboards | 0.73 | 12/16/1999 17:21:21 | 1 | 5/2/2000 16:01:21 | 78 |
| Without Keyboards | Handhelds/ PDAs | 0.81 | 12/16/1999 17:21:21 | 1 | 3/15/2000 17:21:21 | 98 |

*Fig. 4D*

User Product Feature Distribution

| Product ID | Feature ID | Value | Value Probability |
|---|---|---|---|
| Webcams | Interface | PC Card | 0.7 |
| Webcams | Interface | Serial | 0.2 |

*Fig. 4E*

User Cluster Tree

| Cluster ID | Cluster Parent ID |
|---|---|
| C123 | C3345 |

User Fuzzy Cluster Tree

| Cluster ID | Cluster Parent ID | Cluster Probability |
|---|---|---|
| Bob | C1 | 0.3 |
| Bob | C2 | 0.2 |
| Bob | C3 | 0.1 |
| Bob | C4 | 0.4 |
| C1 | C11 | 0.2 |

Topic Tree

| Topic ID | Depth Level | Topic Parent ID | Number of Children | Children |
|---|---|---|---|---|
| Investing | 2 | Business | 3 | International, Resources, Socially Responsible |
| Employment | 2 | Business | 4 | Careers, Recruiters, Resumes, Seasonal |

*Fig. 8*

Topic Experts

| Topic ID | Topic Parent ID | Cluster 1 | Cluster 2 | Cluster 2 | Cluster 2 |
|---|---|---|---|---|---|
| Investing | Business | C112 | C113 | C114 | |
| Employment | Business | C241 | C212 | C159 | |

*Fig. 9*

Product Tree

| Product ID | Depth Level | Product Parent ID | Number of Children | Children |
|---|---|---|---|---|
| Cameras | 3 | Consumer Electronics | 2 | Digital Cameras, Webcams |
| Consumer Electronics | 2 | Top | 3 | CD Players, Cameras, Personal Minidiscs |

*Fig. 11*

Product Feature List

| Product ID | Feature | Value |
|---|---|---|
| Sony CDP-CX350 | Brand | Sony |
| Sony CDP-CX350 | CD Capacity | 50 Discs or Greater |
| Sony CDP-CX350 | Digital Output | Optical |

*Fig. 12A*

Product Feature Value List

| Feature | Value |
|---|---|
| Digital Output | Coaxial and Optical |
| Digital Output | Coaxial |
| Digital Output | Optical |
| Digital Output | No |

*Fig. 12B*

User Recently Accessed Butter

| Document ID | Access Time | Interaction Type | Context | Degree of Interest |
|---|---|---|---|---|
| www.herring.com/insider | 5/12/2000 14:37:21 | Navigation | bookmark access | positive, followed 3 links 12 minutes |
| www.m-w.com | 5/12/2000 15:08:21 | Search | query "dictionary" | positive, followed 5 links bookmarked, 21 minutes |

*Fig. 14*

User Site Candidate Table

| Site Name | Number of Access | Last Access Time |
|---|---|---|
| www.herring.com | 157 | 5/12/2000 14:37:21 |
| www.m-w.com | 162 | 5/12/2000 15:08:21 |

*Fig. 15A*

User Word Candidate Table

| Word ID | Word Spelling | Word Spelling | Word Grade | Last Access Time |
|---|---|---|---|---|
| Cytochrome | Cytochrome | Cytocrome | 0.67 | 4/16/200 7:10:01 |
| Hyperbilirubinemia | Hyperbilirubinemia | Hyperbilirubenema | 0.58 | 4/27/2000 12:18:42 |

*Fig. 15B*

User Recently Purchased Products

| Product ID | Parent Node | Purchase Time | Purchase Source |
|---|---|---|---|
| Panasonic SL-502 | Discmans | 5/1/2000 16:01:04 | ebyweb.com |
| Hitachi VM6500A | Camcorders | 5/3/2000 18:19:21 | supremevideo.com |

*Fig. 16*

AUTOMATIC, PERSONALIZED ONLINE INFORMATION AND PRODUCT SERVICES

CROSS-REFERENCE TO RELATED APPLICATIONS

This application is a continuation of U.S. patent application Ser. No. 13/619,427 filed Sep. 14, 2012, which is a continuation of U.S. patent application Ser. No. 12/692,252 filed Jan. 22, 2010, now issued as U.S. Pat. No. 8,301,764, which is a continuation of U.S. patent application Ser. No. 12/008,148 filed Jan. 8, 2008, now issued as U.S. Pat. No. 7,685,276, which is a continuation of U.S. patent application Ser. No. 11/316,785 filed Dec. 22, 2005, now issued as U.S. Pat. No. 7,320,031, which is a continuation application of U.S. patent application Ser. No. 09/597,975 filed Jun. 20, 2000, now issued as U.S. Pat. No. 6,981,040, which claims the priority benefit of U.S. Provisional Patent Application No. 60/173,392 filed Dec. 28, 1999, all of which are all herein incorporated by reference in their entirety.

FIELD OF THE INVENTION

This invention relates generally to methods for personalizing a user's interaction with information in a computer network. More particularly, it relates to methods for predicting user interest in documents and products using a learning machine that is continually updated based on actions of the user and similar users.

BACKGROUND ART

The amount of static and dynamic information available today on the Internet is staggering, and continues to grow exponentially. Users searching for information, news, or products and services are quickly overwhelmed by the volume of information, much of it useless and uninformative. A variety of techniques have been developed to organize, filter, and search for information of interest to a particular user. Broadly, these methods can be divided into information filtering techniques and collaborative filtering techniques.

Information filtering techniques focus on the analysis of item content and the development of a personal user interest profile. In the simplest case, a user is characterized by a set of documents, actions regarding previous documents, and user-defined parameters, and new documents are characterized and compared with the user profile. For example, U.S. Pat. No. 5,933,827, issued to Cole et al., discloses a system for identifying new web pages of interest to a user. The user is characterized simply by a set of categories, and new documents are categorized and compared with the user's profile. U.S. Pat. No. 5,999,975, issued to Kittaka et al., describes an online information providing scheme that characterizes users and documents by a set of attributes, which are compared and updated based on user selection of particular documents. U.S. Pat. No. 6,006,218, issued to Breese et al., discloses a method for retrieving information based on a user's knowledge, in which the probability that a user already knows of a document is calculated based on user-selected parameters or popularity of the document. U.S. Pat. No. 5,754,939, issued to Herz et al., discloses a method for identifying objects of interest to a user based on stored user profiles and target object profiles. Other techniques rate documents using the TFIDF (term frequency, inverse document frequency) measure. The user is represented as a vector of the most informative words in a set of user-associated documents. New documents are parsed to obtain a list of the most informative words, and this list is compared to the user's vector to determine the user's interest in the new document.

Existing information filtering techniques suffer from a number of drawbacks. Information retrieval is typically a two step process, collection followed by filtering; information filtering techniques personalize only the second part of the process. They assume that each user has a personal filter, and that every network document is presented to this filter. This assumption is simply impractical given the current size and growth of the Internet; the number of web documents is expected to reach several billion in the next few years. Furthermore, the dynamic nature of the documents, e.g., news sites that are continually updated, makes collection of documents to be filtered later, a challenging task for any system. User representations are also relatively limited, for example, including only a list of informative words or products or user-chosen parameters, and use only a single mode of interaction to make decisions about different types of documents and interaction modes. In addition, information filtering techniques typically allow for extremely primitive updating of a user profile, if any at all, based on user feedback to recommended documents. As a user's interests change rapidly, most systems are incapable of providing sufficient personalization of a user's experience.

Collaborative filtering methods, in contrast, build databases of user opinions of available items, and then predict a user opinion based on the judgments of similar users. Predictions typically require offline data mining of very large databases to recover association rules and patterns; a significant amount of academic and industrial research is focussed on developing more efficient and accurate data mining techniques. The earliest collaborative filtering systems required explicit ratings by the users, but existing systems are implemented without the user's knowledge by observing user actions. Ratings are inferred from, for example, the amount of time a user spends reading a document or whether a user purchases a particular product. For example, an automatic personalization method is disclosed in B. Mobasher et al., "Automatic Personalization Through Web Usage Mining," Technical Report TR99-010, Department of Computer Science, Depaul University, 1999. Log files of documents requested by users are analyzed to determine usage patterns, and online recommendations of pages to view are supplied to users based on the derived patterns and other pages viewed during the current session.

Recently, a significant number of web sites have begun implementing collaborative filtering techniques, primarily for increasing the number and size of customer purchases. For example, Amazon.com™ has a "Customers Who Bought" feature, which recommends books frequently purchased by customers who also purchased a selected book, or authors whose work is frequently purchased by customers who purchased works of a selected author. This feature uses a simple "shopping basket analysis"; items are considered to be related only if they appear together in a virtual shopping basket. Net Perceptions, an offshoot of the GroupLens project at the University of Minnesota, is a company that provides collaborative filtering to a growing number of web sites based on data mining of server logs and customer transactions, according to predefined customer and product clusters.

Numerous patents disclose improved collaborative filtering systems. A method for item recommendation based on automated collaborative filtering is disclosed in U.S. Pat. No. 6,041,311, issued to Chislenko et al. Similarity factors are maintained for users and for items, allowing predictions based on opinions of other users. In an extension of standard collaborative filtering, item similarity factors allow predictions to be made for a particular item that has not yet been rated, but that is similar to an item that has been rated. A method for determining the best advertisements to show to users is disclosed in U.S. Pat. No. 5,918,014, issued to Robinson. A user is shown a particular advertisement based on the response of a community of similar users to the particular advertisement. New ads are displayed randomly, and the community interest is recorded if enough users click on the ads. A collaborative filtering system using a belief network is disclosed in U.S. Pat. No. 5,704,317, issued to Heckerman et al., and allows automatic clustering and use of non-numeric attribute values of items. A multi-level mindpool system for collaborative filtering is disclosed in U.S. Pat. No. 6,029,161, issued to Lang et al. Hierarchies of users are generated containing clusters of users with similar properties.

Collaborative filtering methods also suffer from a number of drawbacks, chief of which is their inability to rate content of an item or incorporate user context. They are based only on user opinions; thus an item that has never been rated cannot be recommended or evaluated. Similarly, obscure items, which are rated by only a few users, are unlikely to be recommended. Furthermore, they require storage of a profile for every item, which is unfeasible when the items are web pages. New items cannot be automatically added into the database. Changing patterns and association rules are not incorporated in real time, since the data mining is performed offline. In addition, user clusters are also static and cannot easily be updated dynamically.

Combinations of information filtering and collaborative filtering techniques have the potential to supply the advantages provided by both methods. For example, U.S. Pat. No. 5,867,799, issued to Lang et al., discloses an information filtering method that incorporates both content-based filtering and collaborative filtering. However, as with content-based methods, the method requires every document to be filtered as it arrives from the network, and also requires storage of a profile of each document. Both of these requirements are unfeasible for realistically large numbers of documents. An extension of this method, described in U.S. Pat. No. 5,983,214, also to Lang et al., observes the actions of users on content profiles representing information entities. Incorporating collaborative information requires that other users have evaluated the exact content profile for which a rating is needed.

In summary, none of the existing prior art methods maintain an adaptive content-based model of a user that changes based on user behavior, allow for real-time updating of the model, operate during the collection stage of information retrieval, can make recommendations for items or documents that have never been evaluated, or model a user based on different modes of interaction.

OBJECTS AND ADVANTAGES

Accordingly, it is a primary object of the present invention to provide a method of personalizing user interaction with network documents that maintains an adaptive content-based profile of the user.

It is another object of the invention to incorporate into the profile user behavior during different modes of interaction with information, thus allowing for cross-fertilization. Learning about the user interests in one mode benefits all other modes.

It is a further object of the invention to provide a method that jointly models the user's information needs and product needs to provide stronger performance in both modes.

It is an additional object of the invention to provide a method that personalizes both the collection and filtering stages of information retrieval to manage efficiently the enormous number of existing web documents.

It is another object of the invention to provide a method for predicting user interest in an item that incorporates the opinions of similar users without requiring storage and maintenance of an item profile.

It is a further object of the invention to provide an information personalization method that models the user as a function independent of any specific representation or data structure, and represents the user interest in a document or product independently of any specific user information need. This approach enables the addition of new knowledge sources into the user model.

It is an additional object of the present invention to provide a method based on Bayesian statistics that updates the user profile based on both negative and positive examples.

It is a further object of the invention to model products by analyzing all relevant knowledge sources, such as press releases, reviews, and articles, so that a product can be recommended even if it has never been purchased or evaluated previously.

SUMMARY

These objects and advantages are attained by a computer-implemented method for providing automatic, personalized information services to a user. User interactions with a computer are transparently monitored while the user is engaged in normal use of the computer, and monitored interactions are used to update user-specific data files that include a set of documents associated with the user. Parameters of a learning machine, which define a User Model specific to the user, are estimated from the user-specific data files. Documents that are of interest and documents that are not of interest to the user are treated distinctly in estimating the parameters. The parameters are used to estimate a probability $P(u|d)$ that a document is of interest to the user, and the estimated probability is then used to provide personalized information services to the user.

The probability is estimated by analyzing properties of the document and applying them to the learning machine. Documents of multiple distinct media types of analyzed, and identified properties include: the probability that the document is of interest to users who are interested in particular topics, a topic classifier probability distribution, a product model probability distribution, product feature values extracted from the document, the document author, the document age, a list of documents linked to the document, the document language, number of users who have accessed the document, number of users who have saved the document in a favorite document list, and a list of users previously interested in the document. All properties are independent of the particular user. The product model probability distribution, which indicates the probability that the document refers to particular products, is obtained by applying the document properties to a product model, a learning machine with product parameters characterizing particular products. These product parameters are themselves updated based on the document properties and on the product model probability distribution. Product parameters are initialized from a set of documents associated with each product.

User interactions are monitored during multiple distinct modes of user interaction with network data, including a network searching mode, network navigation mode, network browsing mode, email reading mode, email writing mode, document writing mode, viewing "pushed" information mode, finding expert advice mode, and product purchasing mode. Based on the monitored interactions, parameters of the learning machine are updated. Learning machine parameters define various user-dependent functions of the User Model, including a user topic probability distribution representing interests of the user in various topics, a user product probability distribution representing interests of the user in various products, a user product feature probability distribution representing interests of the user in various features of each of the various products, a web site probability distribution representing interests of the user in various web sites, a cluster probability distribution representing similarity of the user to users in various clusters, and a phrase model probability distribution representing interests of the user in various phrases. Some of the user-dependent functions can be represented as information theory based measures representing mutual information between the user and either phrases, topics, products, features, or web sites. The product and feature distributions can also be used to recommend products to the user.

The User Model is initialized from documents provided by the user, a web browser history file, a web browser bookmarks file, ratings by the user of a set of documents, or previous product purchases made by the user. Alternatively, the User Model may be initialized by selecting a set of predetermined parameters of a prototype user selected by the user. Parameters of the prototype user are updated based on actions of users similar to the prototype user. The User Model can be modified based on User Model modification requests provided by the user. In addition, the user can temporarily use a User Model that is built from a set of predetermined parameters of a profile selected by the user.

Distances between users are calculated to determine similar users, who are clustered into clusters of similar users. Parameters defining the User Model may include the calculated distances between the User Model and User Models of users within the user's cluster. Users may also be clustered based on calculated relative entropy values between User Models of multiple users.

A number of other probabilities can be calculated, such as a posterior probability $P(u|d,q)$ that the document is of interest to the user, given a search query submitted by the user. Estimating the posterior probability includes estimating a probability that the query is expressed by the user with an information need contained in the document. In addition, the probability $P(u|d,con)$ that the document is of interest to the user during a current interaction session can be calculated. To do so, $P(u,con|d)/P(con|d)$ is calculated, where con represents a sequence of interactions during the current interaction session or media content currently marked by the user. A posterior probability $P(u|d,q,con)$ that the document is of interest to the user, given a search query submitted during a current interaction session, can also be calculated.

A variety of personalized information services are provided using the estimated probabilities. In one application, network documents are crawled and parsed for links, and probable interest of the user in the links is calculated using the learning machine. Links likely to be of interest to the user are followed. In another application, the user identifies a document, and a score derived from the estimated probability is provided to the user. In an additional application, the user is provided with a three-dimensional map indicating user interest in each document of a hyperlinked document collection. In a further application, an expert user is selected from a group of users. The expert user has an expert User Model that indicates a strong interest in a document associated with a particular area of expertise. Another application includes parsing a viewed document for hyperlinks and separately estimating for each hyperlink a probability that the linked document is of interest to the user. In a further application, user interest information derived from the User Model is sent to a third party web server that then customizes its interaction with the user. Finally, a set of users interested in a document is identified, and a range of interests for the identified users is calculated.

BRIEF DESCRIPTION OF THE FIGURES

FIGS. 4A-4E illustrate tables that store different components and parameters of the User Model.

FIG. 8 is a table that stores nodes of the topic tree of FIG. 7.

FIG. 9 is a table that stores the names of clusters having the most interest in nodes of the topic tree of FIG. 7, used to implement the topic experts model.

FIG. 11 is a table that stores nodes of the product tree of FIG. 10.

FIG. 12A is a table that stores feature values of products of the product tree of FIG. 10.

FIG. 12B is a table that stores potential values of product features associated with intermediate nodes of the product tree of FIG. 10.

FIG. 14 illustrates the user recently accessed buffer, which records all user interactions with documents.

FIG. 15A is a table for storing sites that are candidates to include in the user site distribution.

FIG. 15B is a table for storing words that are candidates to include in the user word distribution.

FIG. 16 is a table that records all products the user has purchased.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The present invention, referred to as Personal Web, provides automatic, personalized information and product services to a computer network user. In particular, Personal Web is a user-controlled, web-centric service that creates for each user a personalized perspective and the ability to find and connect with information on the Internet, in computer networks, and from human experts that best matches his or her interests and needs. A computer system 10 implementing Personal Web 12 is illustrated schematically in FIG. 1. Personal Web 12 is stored on a central computer or server 14 on a computer network, in this case the Internet 16, and interacts with client machines 18, 20, 22, 24, 26 via client-side software. Personal Web 12 may also be stored on more than one central computers or servers that interact over the network. The client-side software may be part of a web browser, such as Netscape Navigator or Microsoft Internet Explorer, configured to interact with Personal Web 12, or it may be distinct from but interacting with a client browser. Five client machines are illustrated for simplicity, but Personal Web 12 is intended to provide personalized web services for a large number of clients simultaneously.

For all of the typical interactions that a user has with a computer network, such as the world wide web, Personal Web 12 provides a personalized version. Personal Web 12 stores for each user a User Model 13 that is continuously and transparently updated based on the user's interaction with the network, and which allows for personalization of all interaction modes. The User Model represents the user's information and product interests; all information that is presented to the user has been evaluated by the User Model to be of interest to the user. The User Model allows for cross fertilization; that is, information that is learned in one mode of interaction is used to improve performance in all modes of interaction. The User Model is described in detail below.

Figure 1:
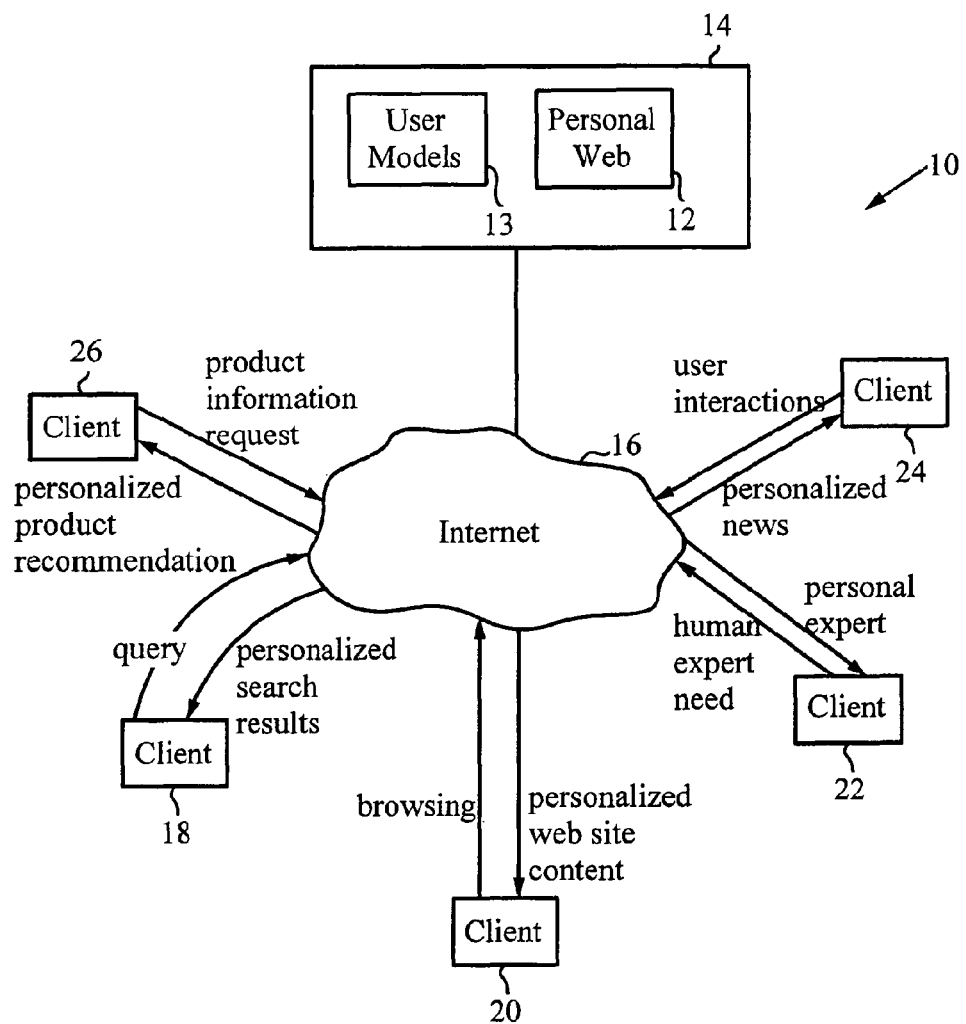
FIG. 1 is a schematic diagram of a computer system in which the present invention is implemented.

Five examples of personalized interaction modes provided by the present invention are illustrated in FIG. 1. However, it is to be understood that the present invention provides for personalization of all modes, and that the following examples in no way limit the scope of the present invention. Personal Web is active during all stages of information processing, including collection, retrieval, filtering, routing, and query answering.

Client 18 performs a search using Personal Web 12 by submitting a query and receiving personalized search results. The personal search feature collects, indexes, and filters documents, and responds to the user query, all based on the user profile stored in the User Model 13. For example, the same query (e.g., "football game this weekend" or "opera") submitted by a teenager in London and an adult venture capitalist in Menlo Park returns different results based on the personality, interests, and demographics of each user. By personalizing the collection phase, the present invention does not require that all network documents be filtered for a particular user, as does the prior art.

Client 20 browses the web aided by Personal Web 12. In browsing mode, the contents of a web site are customized according to the User Model 13. Personal Web interacts with a cooperating web site by supplying User Model information, and a web page authored in a dynamic language (e.g., DHTML) is personalized to the user's profile. In navigation mode, a personal navigation aid suggests to the user relevant links within the visited site or outside it given the context, for example, the current web page and previously visited pages, and knowledge of the user profile.

Client 22 illustrates the find-an-expert mode of Personal Web 12. The user supplies an expert information or product need in the form of a sample web page or text string, and Personal Web 12 locates an expert in the user's company, circle of friends, or outside groups that has the relevant information and expertise, based on the expert's User Model 13. The located expert not only has the correct information, but presents it in a manner of most interest to the user, for example, focussing on technical rather than business details of a product.

Client 24 uses the personal pushed information mode of Personal Web 12. Personal Web 12 collects and presents personal information to a user based on the User Model 13. The pushed information is not limited to a fixed category or topic, but includes any information of interest to the user. In communities, organizations, or group of users, the pushed information can include automatic routing and delivery of newly created documents that are relevant to the users.

Finally, client 26 illustrates the product recommendation mode of Personal Web 12. The user submits a query for information about a product type, and Personal Web 12 locates the products and related information that are most relevant to the user, based on the User Model 13. As described further below, product information is gathered from all available knowledge sources, such as product reviews and press releases, and Personal Web 12 can recommend a product that has never been purchased or rated by any users.

All of the above features of Personal Web 12 are based on a User Model 13 that represents user interests in a document or product independently of any specific user information need, i.e., not related to a specific query. The User Model 13 is a function that is developed and updated using a variety of knowledge sources and that is independent of a specific representation or data structure. The underlying mathematical framework of the modeling and training algorithms discussed below is based on Bayesian statistics, and in particular on the optimization criterion of maximizing posterior probabilities. In this approach, the User Model is updated based on both positive and negative training examples. For example, a search result at the top of the list that is not visited by the user is a negative training example.

The User Model 13, with its associated representations, is an implementation of a learning machine. As defined in the art, a learning machine contains tunable parameters that are altered based on past experience. Personal Web 12 stores parameters that define a User Model 13 for each user, and the parameters are continually updated based on monitored user interactions while the user is engaged in normal use of a computer. While a specific embodiment of the learning machine is discussed below, it is to be understood that any model that is a learning machine is within the scope of the present invention.

Figure 2:
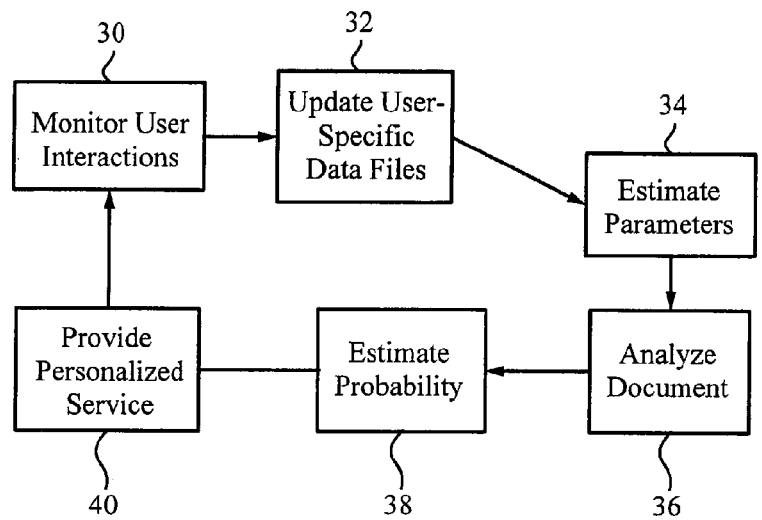
FIG. 2 is a block diagram of a method of the present invention for providing personalized product and information services to a user.

The present invention can be considered to operate in three different modes: initialization, updating or dynamic learning, and application. In the initialization mode, a User Model 13 is developed or trained based in part on a set of user-specific documents. The remaining two modes are illustrated in the block diagram of FIG. 2. While the user is engaged in normal use of a computer, Personal Web 12 operates in the dynamic learning mode to transparently monitor user interactions with data (step 30) and update the User Model 13 to reflect the user's current interests and needs. This updating is performed by updating a set of user-specific data files in step 32, and then using the data files to update the parameters of the User Model 13 in step 34. The user-specific data files include a set of documents and products associated with the user, and monitored user interactions with data. Finally, Personal Web 12 applies the User Model 13 to unseen documents, which are first analyzed in step 36, to determine the user's interest in the document (step 38), and performs a variety of services based on the predicted user interest (step 40). In response to the services provided, the user performs a series of actions, and these actions are in turn monitored to further update the User Model 13.

The following notation is used in describing the present invention. The user and his or her associated representation are denoted with u, a user query with q, a document with d, a product or service with p, a web site with s, topic with t, and a term, meaning a word or phrase, with w. The term "document" includes not just text, but any type of media, including, but not limited to, hypertext, database, spreadsheet, image, sound, and video. A single document may have one or multiple distinct media types. Accordingly, the set of all possible documents is D, the set of all users and groups is U, the set of all products and services is P, etc. The user information or product need is a subset of D or P. Probability is denoted with P, and a cluster of users or of clusters with c, with which function semantics are used. For example, $c(c(u))$ is the cluster of clusters in which the user u is a member ("the grandfather cluster"). Note that an explicit notation of world knowledge, such as dictionaries, atlases, and other general knowledge sources, which can be used to estimate the various posterior probabilities, is omitted.

A document classifier is a function whose domain is any document, as defined above, and whose range is the continuous interval [0,1]. For example, a document classifier may be a probability that a document d is of interest to a particular user or a group of users. Specific document classifiers of the present invention are obtained using the User Model 13 and Group Model. The User Model 13 represents the user interest in a document independent of any specific user information need. This estimation is unique to each user. In strict mathematical terms, given a user u and a document d, the User Model 13 estimates the probability $P(u|d)$. $P(u|d)$ is the probability of the event that the user u is interested in the document d, given everything that is known about the document d. This classifier is extended to include $P(u|d,con)$, the probability that a user is interested in a given document based on a user's current context, for example, the web pages visited during a current interaction session.

The Group or Cluster Model is a function that represents the interest level of a group of users in a document independently of any specific information need. For example, for the group of users c(u), the mathematical notation of this probability, which is determined by applying the Group Model to a document d, is $P(c(u)|d)$.

Figure 3:
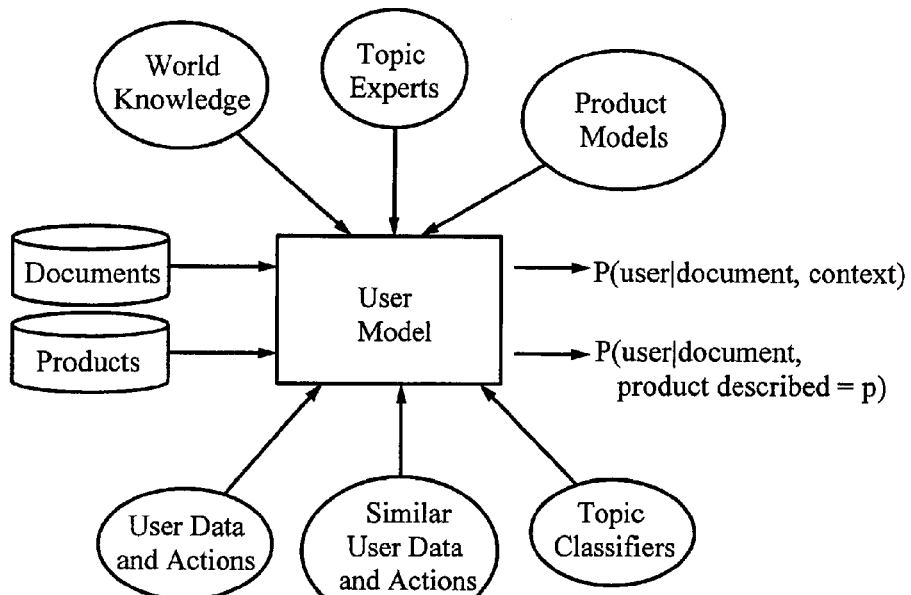
FIG. 3 is a schematic diagram of knowledge sources used as inputs to the User Model and resulting outputs.

A schematic diagram of the User Model is shown in FIG. 3, which illustrates the various knowledge sources (in circles) used as input to the User Model. The knowledge sources are used to initialize and update the User Model, so that it can accurately take documents and generate values of user interest in the documents, given the context of the user interaction. Note that some of the knowledge sources are at the individual user level, while others refer to aggregated data from a group of users, while still others are independent of all users. Also illustrated in FIG. 3 is the ability of the User Model to estimate a user interest in a given product, represented mathematically as the interest of a user in a particular document, given that the document describes the product: $P(user|document, product described=p)$. As explained further below, the long-term user interest in a product is one of many probabilities incorporated into the computation of user interest in all documents, but it can also be incorporated into estimation of a current user interest in a product.

Beginning at the bottom left of FIG. 3, User Data and Actions include all user-dependent inputs to the User Model, including user browser documents, user-supplied documents, other user-supplied data, and user actions, such as browsing, searching, shopping, finding experts, and reading news. Data and actions of similar users are also incorporated into the User Model by clustering all users into a tree of clusters. Clustering users allows estimation of user interests based on the interests of users similar to the user. For example, if the user suddenly searches for information in an area that is new to him or her, the User Model borrows characteristics of User Models of users with similar interests. Topic classifiers are used to classify documents automatically into topics according to a predefined topic tree. Similarly, product models determine the product or product categories, if any, referred to by a document. Product models also extract relevant feature of products from product-related documents. The topic experts input provides input of users with a high interest in a particular topic, as measured by their individual User Models. Finally, the User Model incorporates world knowledge sources that are independent of all users, such as databases of company names, yellow pages, thesauri, dictionaries, and atlases.

User Model Representations

Given the inputs shown in FIG. 3, the User Model is a function that may be implemented with any desired data structure and that is not tied to any specific data structure or representation. The following currently preferred embodiment of abstract data structures that represent the User Model 13 is intended to illustrate, but not limit, the User Model of the present invention. Some of the structures hold data and knowledge at the level of individual users, while others store aggregated data for a group or cluster of users. Initialization of the various data structures of the User Model is described in the following section; the description below is of the structures themselves.

User-dependent inputs are represented by components of the User Model shown in FIGS. 4A-4E. These inputs are shown as tables for illustration purposes, but may be any suitable data structure. The user-dependent components include an informative word or phrase list, a web site distribution, a user topic distribution, a user product distribution, and a user product feature distribution. Each of these user-dependent data structures can be thought of as a vector of most informative or most frequent instances, along with a measure representing its importance to the user.

The informative word and phrase list of FIG. 4A contains the most informative words and phrases found in user documents, along with a measure of each informative phrase or word's importance to the user. As used herein, an "informative phrase" includes groups of words that are not contiguous, but that appear together within a window of a predefined number of words. For example, if a user is interested in the 1999 Melissa computer virus, then the informative phrase might include the words "virus," "Melissa," "security," and "IT," all appearing within a window of 50 words. The sentence "The computer virus Melissa changed the security policy of many IT departments" corresponds to this phrase.

In addition to the words and phrases, the list contains the last access time of a document containing each word or phrase and the total number of accessed documents containing the words. One embodiment of the informative measure is a word probability distribution P(w|u) representing the interest of a user u in a word or phrase w, as measured by the word's frequency in user documents. Preferably, however, the informative measure is not simply a measure of the word frequency in user documents; common words found in many documents, such as "Internet," provide little information about the particular user's interest. Rather, the informative measure should be high for words that do not appear frequently across the entire set of documents, but whose appearance indicates a strong likelihood of the user's interest in a document. A preferred embodiment uses the TFIDF measure, described in Ricardo Baeza-Yates and Berthier Ribeiro-Neto, *Modern Information Retrieval*, Addison Wesley, 1999, in which TF stands for term frequency, and IDF stands for inverse document frequency. Mathematically, if $f_{u,w}$ denotes the frequency of the word w in user u documents, and $D_w$ denotes the number of documents containing the word w, then the importance of a word w to a user u is proportional to the product $f_{u,w} \cdot D/D_w$.

A more preferred embodiment of the measure of each word's importance uses a mathematically sound and novel implementation based on information theory principles. In particular, the measure used is the mutual information between two random variables representing the user and the word or phrase. Mutual information is a measure of the amount of information one random variable contains about another; a high degree of mutual information between two random variables implies that knowledge of one random variable reduces the uncertainty in the other random variable.

For the present invention, the concept of mutual information is adapted to apply to probability distributions on words and documents. Assume that there is a document in which the user's interest must be ascertained. The following two questions can be asked: Does the phrase p appear in the document?; and Is the document of interest to the user u? Intuitively, knowing the answer to one of the questions reduces the uncertainty in answering the other question. That is, if the word w appears in a different frequency in the documents associated with the user u from its frequency in other documents, it helps reduce the uncertainty in determining the interest of user u in the document.

Through the concept of mutual information, information theory provides the mathematical tools to quantify this intuition in a sound way. For a detailed explanation, see T. Cover and J. Thomas, Elements of Information Theory, Wiley, 1991. In this embodiment of the informative measure, two indicator variables are defined. $I_w$ has a value of 1 when the word w appears in a web document and a when it does not, and $I_u$ has a value of 1 when a web document is of interest to the user u and 0 when it does not. The mutual information between the two random variables $I_w$ and $I_u$ is defined as:

$$I(I_w; I_u) = \sum_{i_w \in I_w} \sum_{i_u \in I_u} P(i_w, i_u) \log_2 \frac{P(i_w, i_u)}{P(i_w)P(i_u)}$$

The probabilities in this formula are computed over a set of documents of interest to the user and a set of documents not of interest to the user. For example, consider a set of 100 documents of interest to the user, and a set of 900 documents not of interest to the user. Then $P(i_u=1)=0.1$, and $P(i_u=0)=0.9$. Assume that in the combined set of 1000 documents, 150 contain the word "Bob." Then $P(i_w=1)=0.15$, and $P(i_w=0)$ 0.85. In addition, assume that "Bob" appears in all 100 of the documents of interest to the user. $P(i_w, i_u)$ has the following four values:

| $i_u$ | $i_w$ | $P(i_w, i_u)$ |
|---|---|---|
| 0 | 0 | 850/1000 |
| 0 | 1 | 50/1000 |
| 1 | 0 | 0/1000 |
| 1 | 1 | 100/1000 |

Using the above formula, the mutual information between the user and word Bob is:

$I(I_{Bob}; I_{user}) = 850/1000 \log [850/1000/(0.85 * 0.9)] + 50/1000 \log [50/$ $1000/(0.15 * 0.9)] + 0/1000 \log [0/1000/(0.1 * 0.85)] +$ $100/1000 \log [100/1000/(0.15 * 0.1)]$ $= 0.16.$ Mutual information is a preferred measure for selecting the word and phrase list for each user. The chosen words and phrases have the highest mutual information.

The remaining User Model representations are analogously defined using probability distributions or mutual information. The web site distribution of FIG. 4B contains a list of web sites favored by the user along with a measure of the importance of each site. Given the dynamic nature of the Internet, in which individual documents are constantly being added and deleted, a site is defined through the first backslash (after the www). For example, the uniform resource locator (URL) http://www.herring.com/companies/2000 . . . is considered as www.herring.com. Sites are truncated unless a specific area within a site is considered a separate site; for example, www.cnn.com/health is considered to be a different site than www.cnn.com/us. Such special cases are decided experimentally based on the amount of data available on each site and the principles of data-driven approaches, described in Vladimir S. Cherkassky and Filip M. Mulier, *Learning from Data: Concepts, Theory, and Methods*, in *Adaptive and Learning Systems for Signal Processing, Communications and Control*, Simon Haykin, series editor, Wiley & Sons, March, 1998. Each site has an importance measure, either a discrete probability distribution, P(s|u), representing the interest of user u in a web site s, or the mutual information metric defined above, $I(I_s; I_u)$, representing the mutual information between the user u and a site s. The web site distribution also contains the last access time and number of accesses for each site.

FIG. 4C illustrates the user topic distribution, which represents the interests of the user in various topics. The user topic distribution is determined from a hierarchical, user-independent topic model, for example a topic tree such as the Yahoo directory or the Open Directory Project, available at http://dmoz.org/. Each entry in the tree has the following form: Computers\Internet\WWW\Searching the Web\Directories\Open Directory Project\ where the topic following a backslash is a child node of the topic preceding the backslash. The topic model is discussed in more detail below.

For each node of the topic tree, a probability is defined that specifies the user interest in the topic. Each level of the topic model is treated distinctly. For example, for the top level of the topic model, there is a distribution in which $P(t_u|u) + P(t_l|u) = 1,$ where $t_l$ represents the top level of topics and is the same set of topics for each user, e.g., technology, business, health, etc. P ($t_l|u$) is the sum of the user probabilities on all top level topics. For each topic level, $t_u$ represents specific interests of each user that are not part of any common interest topics, for instance family and friends' home pages. For lower topic levels, every node in the tree is represented in the user topic distribution by a conditional probability distribution. For example, if the Technology node splits into Internet, Communication, and Semiconductors, then the probability distribution is of the form:

$$P(\text{Internet}|u,\text{Technology})+P(\text{Communication}|u,\text{Technology})+P(\text{Semiconductors}|u,\text{Technology})+P(t_u|u,\text{Technology})=1$$

Rather than probabilities, the mutual information metric defined above may be used; $I(I_t,I_u)$ represents the mutual information between the user u and the topic t. An exemplary data structure shown in FIG. 4C for storing the user topic distribution contains, for each topic, the topic parent node, informative measure, last access time of documents classified into the topic, and number of accesses of documents classified into the topic. Note that the User Model contains an entry for every topic in the tree, some of which have a user probability or mutual information of zero.

The user product distribution of FIG. 4D represents the interests of the user in various products, organized in a hierarchical, user-independent structure such as a tree, in which individual products are located at the leaf nodes of the tree. The product taxonomy is described in further detail below. The product taxonomy is similar to the topic tree. Each entry in the tree has the following form:

Consumer Electronics\Cameras\Webcams\3Com Home-Connect\ where a product or product category following a backslash is a child node of a product category preceding the backslash.

For each node of the product model, a probability is defined that specifies the user interest in that particular product or product category. Each level of the product model is treated distinctly. For example, for the top level of the product hierarchy, there is a distribution in which $$P(p_l|u)=1,$$

where $p_l$ represents the top level of product categories and is the same for each user, e.g., consumer electronics, computers, software, etc. For lower product category levels, every node in the tree is represented in the user product distribution by a conditional probability distribution. For example, if the Cameras node splits into Webcams and Digital Cameras, then the probability distribution is of the form:

$$P(\text{Webcams}|u,\text{Cameras})+P(\text{Digital Cameras}|u,\text{Cameras})=1$$

Rather than probabilities, the mutual information metric defined above may be used. Then $I(I_p; I_u)$ represents the mutual information between the user u and the product or product category p. An exemplary data structure for storing the user product distribution contains, for each product, the product ID, product parent node, user probability, last purchase time of the product, number of product purchases, last access time of documents related to the product, and number of related documents accessed.

For each product or category on which the user has a nonzero probability, the User Model contains a user product feature distribution on the relevant features, as shown in FIG. 4E. Each product category has associated with it a list of features, and the particular values relevant to the user are stored along with a measure of the value's importance, such as a probability P(f|u,p) or mutual information measure $I(I_f; I_u)$. For example, Webcams have a feature Interface with possible values Ethernet (10BaseT), Parallel, PC Card, serial, USB, and TV. Probability values of each feature sum to one; that is, $$P(\text{Ethernet}|u,\text{Interface},\text{Webcam})+P(\text{Parallel}|u,\text{Interface},\text{Webcam})+P(\text{PC Card}|u,\text{Interface},\text{Webcam})+P(\text{serial}|u,\text{Interface},\text{Webcam})+P(\text{USB}|u,\text{Interface},\text{Webcam})+P(\text{TV}|u,\text{Interface},\text{Webcam})=1.$$

User probability distributions or mutual information measures are stored for each feature value of each node. Note that there is no user feature value distribution at the leaf nodes, since specific products have particular values of each feature.

Figure 5A:
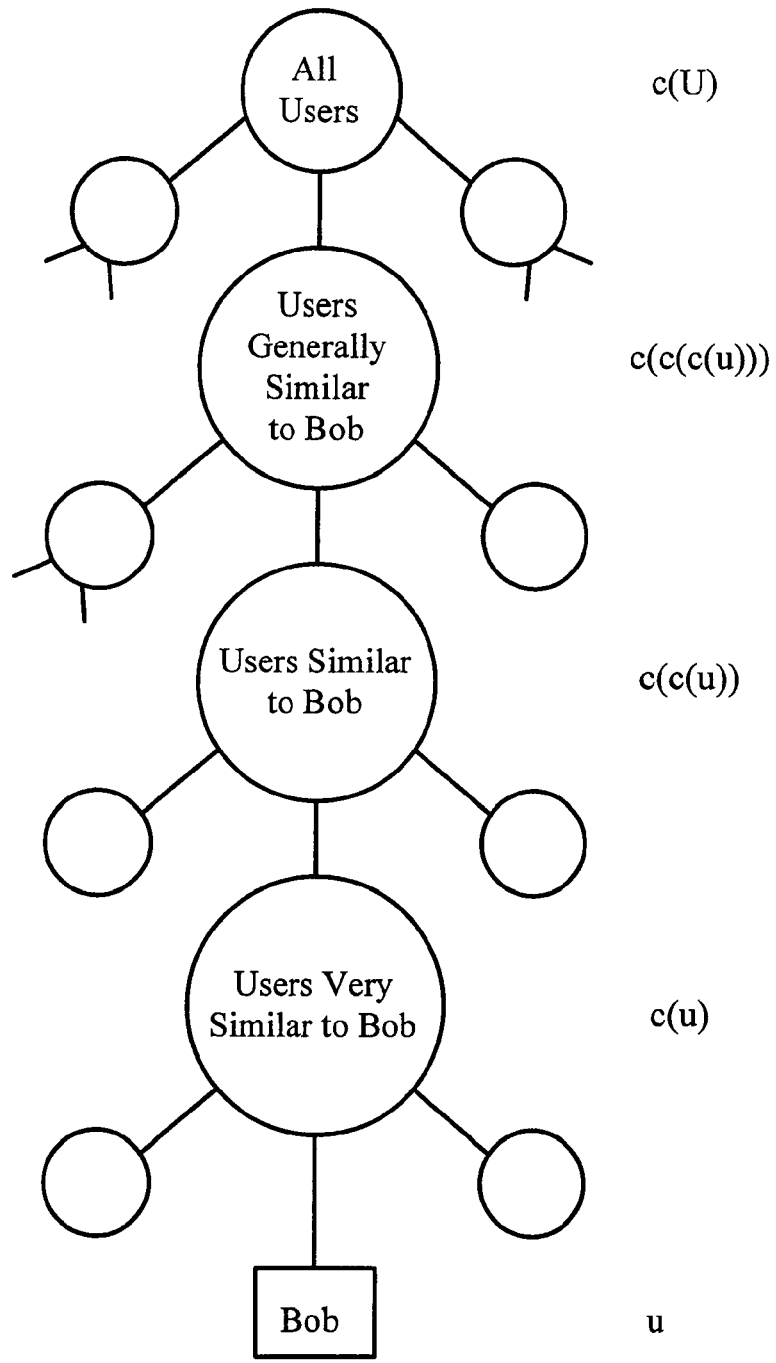
FIG. 5A illustrates a cluster tree containing clusters of users similar to a particular user.
Figures 5B, 6A:
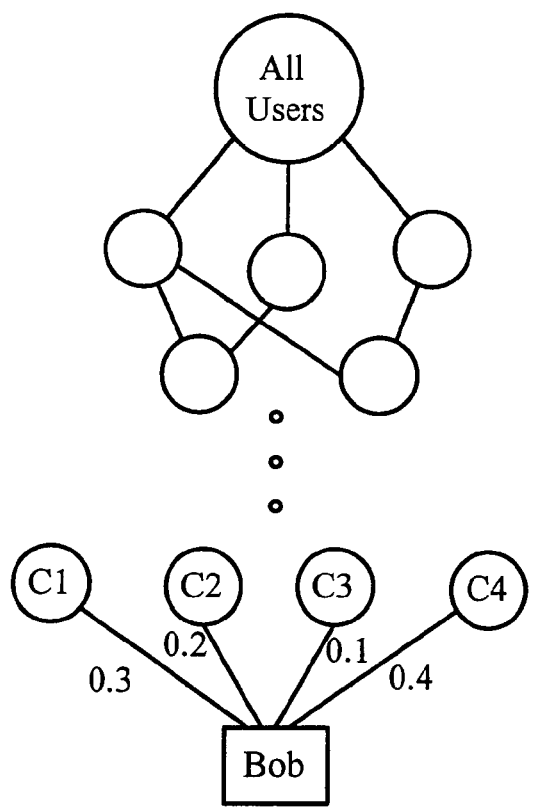
FIG. 5B is a table that stores parameters of a user cluster tree.
FIG. 6A illustrates a preferred cluster tree for implementing fuzzy or probabilistic clustering.

Finally, user-dependent components of the User Model include clusters of users similar to the user. Users are clustered into groups, forming a cluster tree. One embodiment of a user cluster tree, shown in FIG. 5A, hard classifies users into clusters that are further clustered. Each user is a member of one and only one cluster. For example, Bob is clustered into a cluster c(u), which is further clustered into clusters of clusters, until the top level cluster is reached c(U). The identity of the user's parent cluster and grandfather cluster is stored as shown in FIG. 5B, and information about the parent cluster is used as input into the User Model. As described below, clusters are computed directly from User Models, and thus need not have a predefined semantic underpinning.

Figures 6B, 7:
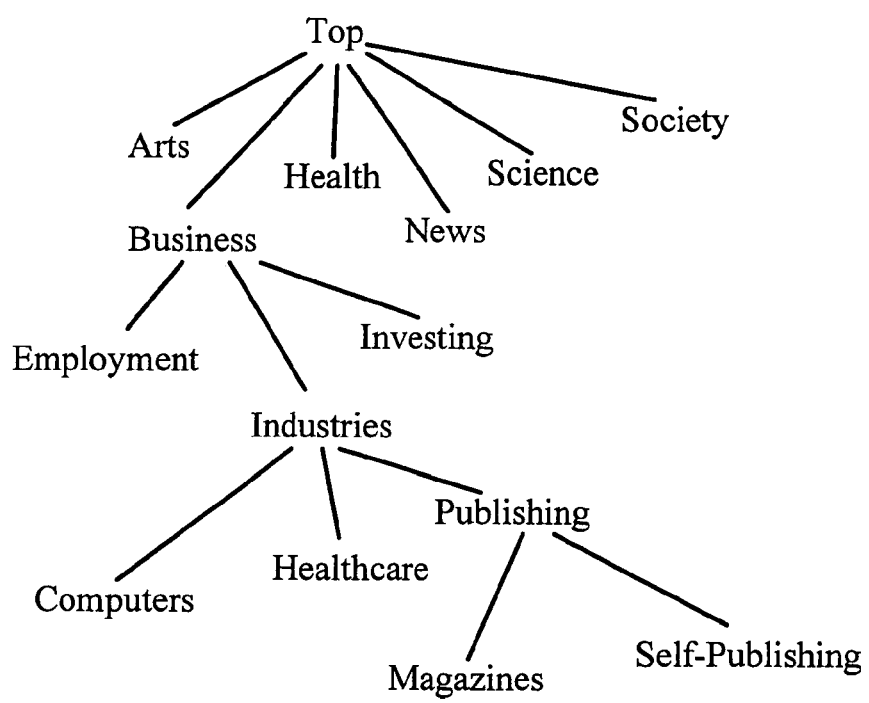
FIG. 6B is a table that stores parameters of a user fuzzy cluster tree.
FIG. 7 illustrates a portion of a topic tree.

Preferably, the User Model does not use hard clustering, but rather uses soft or fuzzy clustering, also known as probabilistic clustering, in which the user belongs to more than one cluster according to a user cluster distribution P(c(u)). FIG. 6A illustrates fuzzy clusters in a cluster hierarchy. In this case, Bob belongs to four different clusters according to the probability distribution shown. Thus Bob is most like the members of cluster C4, but still quite similar to members of clusters C1, C2, C3, and C4. Fuzzy clustering is useful for capturing different interests of a user. For example, a user may be a small business owner, a parent of a small child, and also an avid mountain biker, and therefore need information for all three roles. Probabilistic clustering is described in detail in the Ph.D. thesis of Steven J. Nowlan, "Soft Competitive Adaptation: Neural Network Learning Algorithms Based on Fitting Statistical Mixtures," School of Computer Science, Carnegie Mellon University, Pittsburgh, Pa., 1991. A suitable data structure for representing fuzzy clusters is shown in FIG. 6B. Each row stores the cluster or user ID, one parent ID, and the cluster probability, a measure of similarity between the cluster or user and the parent cluster.

Note that all elements of an individual User Model for a user u also apply to a cluster of users c(u). Thus for each cluster, a Group Model is stored containing an informative word list, a site distribution, a topic distribution, a group product distribution, and a group product feature distribution, each with appropriate measures. For example, P(p|c(u)) represents the interest of a cluster c(u) in various products p.

The user-dependent User Model representations also include a user general information table, which records global information describing the user, such as the User ID, the number of global accesses, the number of accesses within a recent time period, and pointers to all user data structures.

Other knowledge sources of the User Model are independent of the user and all other users. Topic classifiers are used to classify documents into topics according to a predefined topic tree, an example of which is illustrated in FIG. 7. A variety of topic trees are available on the web, such as the Yahoo directory or Open Directory Project (www.dmoz.org). A topic classifier is a model similar to the user model that estimates the probability that a document belongs to a topic. Every node on the topic tree has a stored topic classifier. Thus the set of all topic classifiers computes a probability distribution of all of the documents in the set of documents D among the topic nodes. For example, the topic classifier in the root node in FIG. 7 estimates the posterior probabilities P(t|d), where t represents the topic of document d and is assigned values from the set {Arts, Business, Health, News, Science, Society}. Similarly, the topic classifier for the Business node estimates the posterior probability p(t|d, Business), where t represents the specific topic of the document d within the Business category. Mathematically, this posterior probability is denoted P(t(d)=Business\Investing\|t(d)=Business, d), which represents the probability that the subtopic of the document d within Business is Investing, given that the topic is Business. The topic tree is stored as shown in FIG. 8, a table containing, for each node, the topic ID, depth level, topic parent ID, number of child nodes, and topic ID of the child nodes.

The topic experts model estimates the probability that a document is of interest to users who are interested in a particular topic, independent of any specific user information need. Each node of the topic tree has, in addition to a topic classifier, a corresponding topic expert function. Note that the topic classifier and topic expert function are independent; two documents can be about investing, but one of high interest to expert users and the other of no interest to expert users. The topic expert model can be considered an evaluation of the quality of information in a given document. The assumption behind the topic experts model is that the degree of interest of a user in a given topic is his or her weight for predicting the quality or general interest level in a document classified within the particular topic. Obviously there are outliers to this assumption, for example, novice users. However, in general and averaged across many users, this measure is a good indicator of a general interest level in a document. For every topic in the tree, a list of the N clusters with the most interest in the topic based on the cluster topic distribution is stored. The cluster topic distribution is similar to the user topic distribution described above, but is averaged over all users in the cluster. An exemplary data structure for storing the topic experts model is shown in FIG. 9.

Figure 10:
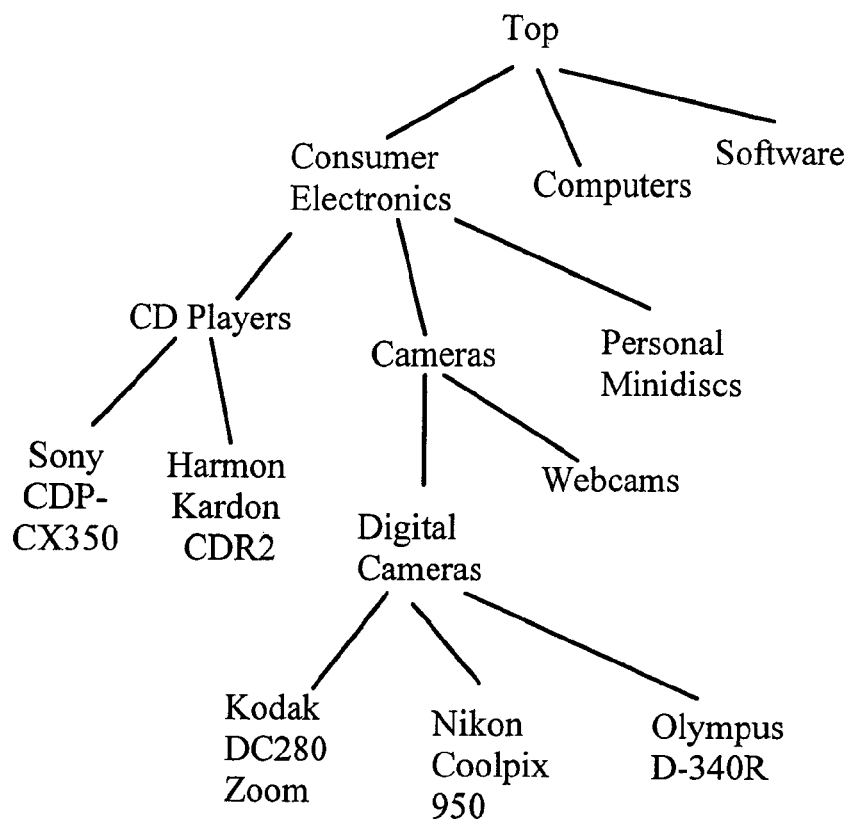
FIG. 10 illustrates a portion of a product tree.

Finally, a product model is stored for every node of a product taxonomy tree, illustrated in FIG. 10. Examples of product taxonomy trees can be found at www.cnet.com and www.productopia.com among other locations. In any product taxonomy tree, the leaf nodes, i.e., the bottom nodes of the tree, correspond to particular products, while higher nodes represent product categories. Product models are similar to topic classifiers and User Models, and are used to determine whether a document is relevant to a particular product or product category. Thus a product model contains a list of informative words, topics, and sites. The set of all product models computes a probability distribution of all of the documents in the set of documents D among the product nodes. For example, the product model in the root node in FIG. 10 estimates the posterior probabilities P(p|d), where p represents the product referred to in document d and is assigned values from the set {Consumer Electronics, Computers, Software}. Similarly, the product model for the Consumer Electronics node estimates the posterior probability P(p|d, Consumer Electronics), where p represents the product category of the document d within the Consumer Electronics category. Mathematically, this posterior probability is denoted P(p(d)=Consumer Electronics\CD Players\|p(d)=Consumer Electronics, d), which represents the probability that the subproduct category of the document d within Consumer Electronics is CD Players, given that the product category is Consumer Electronics. The product tree is stored as shown in FIG. 11, a table containing, for each node, the topic ID, depth level, topic parent ID, number of child nodes, and topic ID of the child nodes.

Each node of the product tree has an associated product feature list, which contains particular descriptive features relevant to the product or category. Nodes may have associated feature values; leaf nodes, which represent specific products, have values of all relevant product features. Product feature lists are determined by a human with knowledge of the domain. However, feature values may be determined automatically from relevant knowledge sources as explained below.

For example, in the product tree of FIG. 10, CD Players is the parent node of the particular CD players Sony CDP-CX350 and Harman Kardon CDR2. The product category CD Players has the following features: Brand, CD Capacity, Digital Output, Plays Minidisc, and Price Range. Each feature has a finite number of potential feature values; for example, CD Capacity has potential feature values 1 Disc, 1-10 Discs, 10-50 Discs, or 50 Discs or Greater. Individual products, the child nodes of CD Players, have one value of each feature. For example, the Sony CDP-CX350 has a 300 disc capacity, and thus a feature value of 50 Discs or Greater.

Some product features are relevant to multiple product categories. In this case, product features propagate as high up the product tree as possible. For example, digital cameras have the following product features: PC Compatibility, Macintosh Compatibility, Interfaces, Viewfinder Type, and Price Range. Webcams have the following product features: PC Compatibility, Macintosh Compatibility, Interfaces, Maximum Frames per Second, and Price Range. Common features are stored at the highest possible node of the tree; thus features PC Compatibility, Macintosh Compatibility, and Interfaces are stored at the Cameras node. The Digital Cameras node stores only product feature Viewfinder Type, and the Webcams node stores only product feature Maximum Frames per Second. Note that product feature Price Range is common to CD Players and Cameras, and also Personal Minidiscs, and thus is propagated up the tree and stored at node Consumer Electronics.

Individual products at leaf nodes inherit relevant features from all of their ancestor nodes. For example, Kodak CD280 inherits the feature Viewfinder Type from its parent; PC Compatibility, Macintosh Compatibility, and Interfaces from its grandparent; and Price Range from its great-grandparent. A product feature list is stored as shown in FIG. 12A, and contains, for each product ID, the associated feature and its value. All potential feature values are stored in a product feature value list, as shown in FIG. 12B.

The system also includes a document database that indexes all documents D. The document database records, for each document, a document ID, the full location (the URL of the document), a pointer to data extracted from the document, and the last access time of the document by any user. A word database contains statistics of each word or phrase from all user documents. The word database contains the word ID, full word, and word frequency in all documents D, used in calculating informative measures for individual users and clusters.

Initialization of User Model

The User Model is initialized offline using characterizations of user behavior and/or a set of documents associated with the user. Each data structure described above is created during initialization. In other words, the relevant parameters of the learning machine are determined during initialization, and then continually updated online during the update mode.

In one embodiment, the user documents for initializing the User Model are identified by the user's web browser. Most browsers contain files that store user information and are used to minimize network access. In Internet Explorer, these files are known as favorites, cache, and history files. Most commercial browsers, such as Netscape Navigator, have equivalent functionality; for example, bookmarks are equivalent to favorites. Users denote frequently-accessed documents as bookmarks, allowing them to be retrieved simply by selection from the list of bookmarks. The bookmarks file includes for each listing its creation time, last modification time, last visit time, and other information. Bookmarks of documents that have changed since the last user access are preferably deleted from the set of user documents. The Internet Temporary folder contains all of the web pages that the user has opened recently (e.g., within the last 30 days). When a user views a web page, it is copied to this folder and recorded in the cache file, which contains the following fields: location (URL), first access time, and last access time (most recent retrieval from cache). Finally, the history file contains links to all pages that the user has opened within a set time period.

Alternatively, the user supplies a set of documents, not included in any browser files, that represent his or her interests. The User Model can also be initialized from information provided directly by the user. Users may fill out forms, answer questions, or play games that ascertain user interests and preferences. The user may also rate his or her interest in a set of documents provided.

Figure 13:
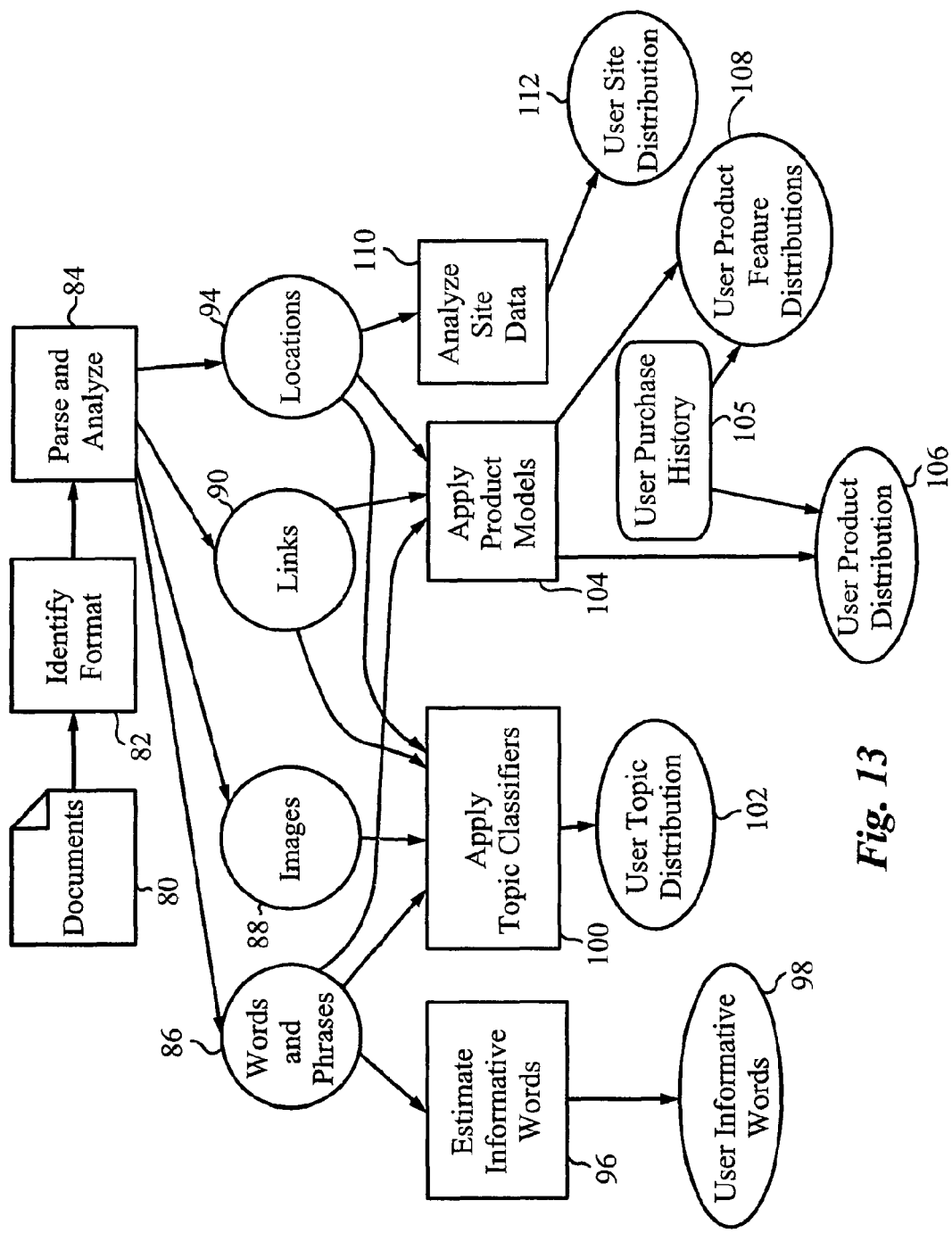
FIG. 13 is a schematic diagram of the method of initializing the User Model.

User documents are analyzed as shown in FIG. 13 to determine initial parameters for the various functions of the User Model. A similar analysis is used during updating of the User Model. Note that during updating, both documents that are of interest to the user and documents that are not of interest to the user are analyzed and incorporated into the User Model. The process is as follows. In a first step 82, the format of documents 80 is identified. In step 84, documents 80 are parsed and separated into text, images and other non-text media 88, and formatting. Further processing is applied to the text, such as stemming and tokenization to obtain a set of words and phrases 86, and information extraction. Through information extraction, links 90 to other documents, email addresses, monetary sums, people's names, and company names are obtained. Processing is performed using natural language processing tools such as LinguistX® and keyword extraction tools such as Thing Finder™, both produced by Inxight (www.inxight.com). Further information on processing techniques can be found in Christopher D. Manning and Hinrich Schutze, *Foundations of Statistical Natural Language Processing*, MIT Press, 1999. Additional processing is applied to images and other non-text media 88. For example, pattern recognition software determines the content of images, and audio or speech recognition software determines the content of audio. Finally, document locations 94 are obtained.

Parsed portions of the documents and extracted information are processed to initialize or update the user representations in the User Model. In step 96, user informative words or phrases 98 are obtained from document words and phrases 86. In one embodiment, a frequency distribution is obtained to calculate a TFIDF measure quantifying user interest in words 98. Alternatively, mutual information is calculated between the two indicator variables $I_w$ and $I_u$ as explained above. The set of informative words 98 contains words with the highest probabilities or mutual information.

In step 100, the topic classifiers are applied to all extracted information and portions of documents 80 to obtain a probability distribution P(t|d) for each document on each node of the topic tree. As a result, each node has a set of probabilities, one for each document, which is averaged to obtain an overall topic node probability. The average probabilities become the initial user topic distribution 102. If desired, mutual information between the two indicator variables $I_t$ and $I_u$ can be determined as explained above.

Similarly, in step 104, product models are applied to all extracted information from documents 80 to classify documents according to the product taxonomy tree. From user purchase history 105, additional product probabilities are obtained. Probabilities for each node are combined after, weighting purchases and product-related documents appropriately, to obtain a user product distribution 106. Note that only some of documents 80 contain product-relevant information and are used to determine the user product distribution 106. Product models return probabilities of zero for documents that are not product related.

The user product feature distribution 108 can be obtained from different sources. If a user has a nonzero probability for a particular product node, then the feature distribution on that node is obtained from its leaf nodes. For example, if one of the user documents was classified into Kodak DC280 and another into Nikon Coolpix 950, then the user product feature distribution for the Digital Cameras node has a probability of 0.5 for the feature values corresponding to each camera. Feature value distributions propagate throughout the user product feature distributions. For example, if the two cameras are in the same price range, $300-$400, then the probability of the value $300-$400 of the feature Price Range is 1.0, which propagates up to the Consumer Electronics node (assuming that the user has no other product-related documents falling within Consumer Electronics).

Alternatively, product feature value distributions are obtained only from products that the user has purchased, and not from product-related documents in the set of user documents. Relevant feature values are distributed as high up the tree as appropriate. If the user has not purchased a product characterized by a particular feature, then that feature has a zero probability. Alternatively, the user may explicitly specify his or her preferred feature values for each product category in the user product distribution. User-supplied information may also be combined with feature value distributions obtained from documents or purchases.

Document locations 94 are analyzed (step 110) to obtain the user site distribution 112. Analysis takes into account the relative frequency of access of the sites within a recent time period, weighted by factors including how recently a site was accessed, whether it was kept in the favorites or bookmarks file, and the number of different pages from a single site that were accessed. Values of weighting factors are optimized experimentally using jackknifing and cross-validation techniques described in H. Bourlard and N. Morgan, *Connectionist Speech Recognition: A Hybrid Approach*, Kluwer Academic Publishers, 1994.

Note that there is typically overlap among the different representations of the User Model. For example, a news document announcing the release of a new generation of Microsoft servers has relevant words Microsoft and server. In addition, it is categorized within the product taxonomy under Microsoft servers and the topic taxonomy under computer hardware. This document may affect the user's word list, product distribution, and topic distribution.

After the User Models are initialized for all users, cluster membership can be obtained. Clusters contain users with a high degree of similarity of interests and information needs. A large number of clustering algorithms are available; for examples, see K. Fukunaga, *Statistical Pattern Recognition*, Academic Press, 1990. As discussed above, users are preferably soft clustered into more than one cluster. Preferably, the present invention uses an algorithm based on the relative entropy measure from information theory, a measure of the distance between two probability distributions on the same event space, described in T. Cover and J. Thomas, *Elements of Information Theory*, Chapter 2, Wiley, 1991. Clustering is unsupervised. That is, clusters have no inherent semantic significance; while a cluster might contain users with a high interest in mountain biking, the cluster tree has no knowledge of this fact.

In a preferred embodiment, the relative entropy between two User Model distributions on a fixed set of documents $D_{sample}$ is calculated. $D_{sample}$ is chosen as a good representation of the set of all documents D. Distributions of similar users have low relative entropy, and all pairs of users within a cluster have relative entropy below a threshold value. The User Model of each user is applied to the documents to obtain a probability of interest of each user in each document in the set. The relative entropy between two user distributions for a single document is calculated for each document in the set, and then summed across all documents.

The exact mathematical computation of the relative entropy between two users is as follows. An indicator variable $I_{u,d}$ is assigned to 1 when a document d is of interest to a user u and 0 when it is not. For two users $u_1$ and $u_2$ and for any document d, the relative entropy between the corresponding distributions is:

$$D(I_{u1,d} \mid I_{u2,d}) = \sum_{i \in 1} P(i_{u1,d}) \log_2 \frac{P(i_{u1,d})}{P(i_{u2,d})}$$

For example, if $P(u_1|d)=0.6$ and $P(u_2I|d)=0.9$, then $$D(I_{u1,d}|I_{u2},d)=0.4 \log(0.4/0.1)+0.6 \log(0.6/0.9).$$

The relative entropy can be converted to a metric D' that obeys the triangle inequality:

$$D'(I_1 2 I_2)=0.5*(D(I_1 2 I_2)+D(I_2 2 I_1)).$$

For any two users $u_1$ and $u_2$, and for each document in $D_{sample}$, the metric D' is computed between the corresponding indicator variable distributions on the document. The values for all document are summed, and this sum is the distance metric for clustering users. This distance is defined as:

$$\text{Distance}(u_1, u_2) = \Sigma_{d_j \in D_{sample}} D'(I_{u1,dj}|I_u 2, d_j).$$

An alternative clustering algorithm computes the relative entropy between individual user distributions in the User Model, for example, between all informative word lists, site distributions, etc., of each user. The equations are similar to those above, but compute relative entropy based on indicator variables such as $I_{u,w}$, which is assigned a value of 1 when a word w is of interest to a user u. The calculated distances between individual user distributions on words, sites, topics, and products are summed to get an overall user distance. This second algorithm is significantly less computationally costly than the preferred algorithm above; selection of an algorithm depends on available computing resources. In either case, relative entropy can also be computed between a user and cluster of users.

Each cluster has a Group or Cluster Model that is analogous to a User Model. Cluster Models are generated by averaging each component of its members' User Models. When fuzzy clusters are used, components are weighted by a user's probability of membership in the cluster.

In some cases, initialization is performed without any user-specific information. A user may not have a large bookmarks file or cache, or may not want to disclose any personal information. For such users, prototype users are supplied. A user can choose one or a combination of several prototype User Models, such as the technologist, the art lover, and the sports fan. Predetermined parameters of the selected prototype user are used to initialize the User Model. Users can also opt to add only some parameters of a prototype user to his or her existing User Model by choosing the prototype user's distribution of topics, words, sites, etc. Note that prototype users, unlike clusters, are semantically meaningful. That is, prototype users are trained on a set of documents selected to represent a particular interest. For this reason, prototype users are known as "hats," as the user is trying on the hat of a prototype user.

Users can also choose profiles on a temporary basis, for a particular session only. For example, in a search for a birthday present for his or her teenage daughter, a venture capitalist from Menlo Park may be interested in information most probably offered to teenagers, and hence may choose a teenage girl profile for the search session.

User-independent components are also initialized. The topic classifiers are trained using the set of all possible documents D. For example, D may be the documents classified by the Open Directory Project into its topic tree. Topic classifiers are similar to a User Model, but with a unimodal topic distribution function (i.e., a topic model has a topic distribution value of 1 for itself and 0 for all other topic nodes). The set of documents associated with each leaf node of the topic tree is parsed and analyzed as with the user model to obtain an informative word list and site distribution. When a topic classifier is applied to a new document, the document's words and location are compared with the informative components of the topic classifier to obtain P(t|d). This process is further explained below with reference to computation of P(u|d). Preferably, intermediate nodes of the tree do not have associated word list and site distributions. Rather, the measures for the word list and site distribution of child nodes are used as input to the topic classifier of their parent nodes. For example, the topic classifier for the Business node of the topic tree of FIG. 7 has as its input, the score of the site of the document to be classified according to the site distributions of the topic models of its child nodes, Employment, Industries, and Investing. The classifier can be any non-linear classifier such as one obtained by training a Multilayer Perceptron (MLP) using jackknifing and cross-validation techniques, as described in H. Bourlard and N. Morgan, *Connectionist Speech Recognition: A Hybrid Approach*, Kluwer Academic Publishers, 1994. It can be shown that a MLP can be trained to estimate posterior probabilities; for details, see J. Hertz, A. Krogh, R. Palmer, *Introduction to The Theory of Neural Computation*, Addison-Wesley, 1991.

The topic experts model is initialized by locating for every node in the topic tree the N clusters that are of the same depth in the user cluster tree as the user, and that have the highest interest in the topic, based on their cluster topic distribution. The cluster topic distribution P(t|c(u)) is simply an average of the user topic distribution P(t|u) for each user in the cluster. The topic experts model is used to determine the joint probability that a document and the topic under consideration are of interest to any user, P(t,d). Using Bayes' rule, this term can be approximated by considering the users of the N most relevant clusters.

$$P(t,d)=\Sigma_{i \in N} P(c_i|t,d)P(t|d)P(d)$$

The topic experts model is, therefore, not a distinct model, but rather an ad hoc combination of user and cluster topic distributions and topic models.

Product models are initialized similarly to User Models and topic classifiers. Each leaf node in the product tree of FIG.

10 has an associated set of documents that have been manually classified according to the product taxonomy. These documents are used to train the product model as shown for the User Model in FIG. 13. As a result, each leaf node of the product tree contains a set of informative words, a topic distribution, and a site distribution. Each node also contains a list of features relevant to that product, which is determined manually. From the documents, values of the relevant features are extracted automatically using information extraction techniques to initialize the feature value list for the product. For example, the value of the CD Capacity is extracted from the document. Information extraction is performed on unstructured text, such as HTML documents, semi-structured text, such as XML documents, and structured text, such as database tables. As with the topic model, a nonlinear function such as a Multilayer Perceptron is used to train the product model.

Preferably, as for topic classifiers, intermediate nodes of the product tree do not have associated word lists, site distributions, and topic distributions. Rather, the measures for the word list, site distribution, and topic distribution of child nodes are used as input to the product models of their parent nodes. Alternatively, each parent node may be trained using the union of all documents of its child nodes.

Updating the User Model

The User Model is a dynamic entity that is refined and updated based on all user actions. User interactions with network data are transparently monitored while the user is engaged in normal use of his or her computer. Multiple distinct modes of interaction of the user are monitored, including network searching, network navigation, network browsing, email reading, email writing, document writing, viewing pushed information, finding expert advice, product information searching, and product purchasing. As a result of the interactions, the set of user documents and the parameters of each user representation in the User Model are modified.

While any nonlinear function may be used in the User Model (e.g., a Multilayer Perceptron), a key feature of the model is that the parameters are updated based on actual user reactions to documents. The difference between the predicted user interest in a document or product and the actual user interest becomes the optimization criterion for training the model.

Through his or her actions, the user creates positive and negative patterns. Positive examples are documents of interest to a user: search results that are visited following a search query, documents saved in the user favorites or bookmarks file, web sites that the user visits independently of search queries, etc. Negative examples are documents that are not of interest to the user, and include search results that are ignored although appear at the top of the search result, deleted bookmarks, and ignored pushed news or email. Conceptually, positive and negative examples can be viewed as additions to and subtractions from the user data and resources.

Information about each document that the user views is stored in a recently accessed buffer for subsequent analysis. The recently accessed buffer includes information about the document itself and information about the user's interaction with the document. One possible implementation of a buffer is illustrated in FIG. 14; however, any suitable data structure may be used. The recently-accessed buffer contains, for each viewed document, a document identifier (e.g., its URL); the access time of the user interaction with the document; the interaction type, such as search or navigation; the context, such as the search query; and the degree of interest, for example, whether it was positive or negative, saved in the bookmarks file, how long the user spent viewing the document, or whether the user followed any links in the document. Additional information is recorded for different modes of interaction with a document as discussed below.

A metric is determined for each document to indicate whether it is a positive, negative or neutral event; this metric can potentially be any grade between 0 and 1, where 0 is a completely negative event, 1 is a completely positive event, and 0.5 is a neutral event. Previous user interactions may be considered in computing the metric; for example, a web site that the user accesses at a frequency greater than a predetermined threshold frequency is a positive example. After each addition to or subtraction from the set of user documents, the document is parsed and analyzed as for the User Model initialization. Extracted information is incorporated into the User Model.

Because the User Model is constantly and dynamically updated, applying the initialization process for each update is inefficient. Preferably, incremental learning techniques are used to update the User Model. Efficient incremental learning and updating techniques provide for incorporating new items into existing statistics, as long as sufficient statistics are recorded. Details about incremental learning can be found in P. Lee, *Bayesian Statistics*, Oxford University Press, 1989.

After a document stored in the recently accessed buffer is parsed, parsed portions are stored in candidate tables. For example, FIGS. 15A and 15B illustrate a user site candidate table and user word candidate table. The user site candidate table holds sites that are candidates to move into the user site distribution of FIG. 4B. The site candidate table stores the site name, i.e., the URL until the first backs lash, except for special cases; the number of site accesses; and the time of last access. The user word candidate table holds the words or phrases that are candidates to move into the user informative word list of FIG. 4A. It contains a word or phrase ID, alternate spellings (or misspellings) of the word, an informative grade, and a time of last access.

Negative examples provide words, sites, and topics that can be used in several ways. The measure of any item obtained from the negative example may be reduced in the user distribution. For example, if the negative example is from a particular site that is in the user site distribution, then the probability or mutual information of that site is decreased. Alternatively, a list of informative negative items may be stored. The negative items are obtained from negative examples and are used to reduce the score of a document containing negative items.

Documents are added to the buffer during all user modes of interaction with the computer. Interaction modes include network searching, network navigation, network browsing, email reading, email writing, document writing, viewing "pushed" information, finding expert advice, and product purchasing. Different types of information are stored in the buffer for different modes. In network searching, search queries are recorded and all search results added to the buffer, along with whether or not a link was followed and access time for viewed search results. In network browsing, the user browses among linked documents, and each document is added to the buffer, along with its interaction time. In email reading mode, each piece of email is considered to be a document and is added to the buffer. The type of interaction with the email item, such as deleting, storing, or forwarding, the sender of the email, and the recipient list are recorded. In email writing mode, each piece of written email is considered a document and added to the buffer. The recipient of the email is recorded. Documents written during document writing mode are added to the buffer. The user's access time with each piece of pushed information and type of interaction, such as saving or forwarding, are recorded. In finding expert advice mode, the user's interest in expert advice is recorded; interest may be measured by the interaction time with an email from an expert, a user's direct rating of the quality of information received, or other suitable measure.

During a product purchasing mode, a similar buffer is created for purchased products, as shown in FIG. 16. All purchased products are used to update the User Model. The user recently purchased products buffer records for each purchase the product ID, parent node in the product tree, purchase time, and purchase source. Purchased products are used to update the user product distribution and user product feature distribution.

If the user feels that the User Model is not an adequate representation of him or her, the user may submit user modification requests. For example, the user may request that specific web sites, topics, or phrases be added to or deleted from the User Model.

User Models for prototype users (hats) are also updated based on actions of similar users. Obviously, it is desirable for prototype User Models to reflect the current state of the representative interest. New web sites appear constantly, and even new informative words appear regularly. For example, technology-related words are introduced and widely adopted quite rapidly; the word list of the Technologist hat should be updated to reflect such changes.

Prototype User Models are updated using actions that are related to the prototype. Actions include documents, user reactions to documents, and product purchases. There are many ways to determine whether an action is relevant to the prototype user. A document that is a positive example for many users (i.e., a followed search result or bookmarked page) and also has a high probability of interest to the prototype user is added to the set of prototype user documents. Actions of users or clusters who are similar to the prototype user, as measured by the relative entropy between individual distributions (words, sites, etc.), are incorporated into the prototype User Model. Additions to the prototype User Model may be weighted by the relative entropy between the user performing the action and the prototype user. Actions of expert users who have a high degree of interest in topics also of interest to the prototype user are incorporated into the prototype User Model.

Note that users who are trying on hats are not able to change the prototype User Model. Their actions affect their own User Models, but not the prototype User Model. Updates to the prototype User Model are based only on actions of users who are not currently trying on hats.

Product models are also continually updated using incremental learning techniques. As described below, the present invention includes crawling network documents and evaluating each document against User Models. Crawled documents are also evaluated by product models. Documents that are relevant to a particular product, as determined by the computed probability P(p|d), are used to update its product model. If a document is determined to be relevant, then each component of the product model is updated accordingly. In addition to the parsing and analysis performed for user documents, information extraction techniques are employed to derive feature values that are compared against feature values of the product model, and also incorporated into the feature value list as necessary. New products can be added to the product tree at any time, with characteristic product feature values extracted from all relevant documents. Relevant documents for updating product models include product releases, discussion group entries, product reviews, news articles, or any other type of document.

By employing dynamically updated product models, the present invention, in contrast with prior art systems, provides for deep analysis of all available product information to create a rich representation of products. The interest of a user in a product can therefore be determined even if the product has never been purchased before, or if the product has only been purchased by a very small number of users.

Applying the User Model to Unseen Documents

The User Model is applied to unseen documents to determine the probability that a document is of interest to the user, or the probability that a document is of interest to a user in a particular context. The basic functionality of this determination is then used in the various applications described in subsequent sections to provide personalized information and product services to the user.

Figure 17:
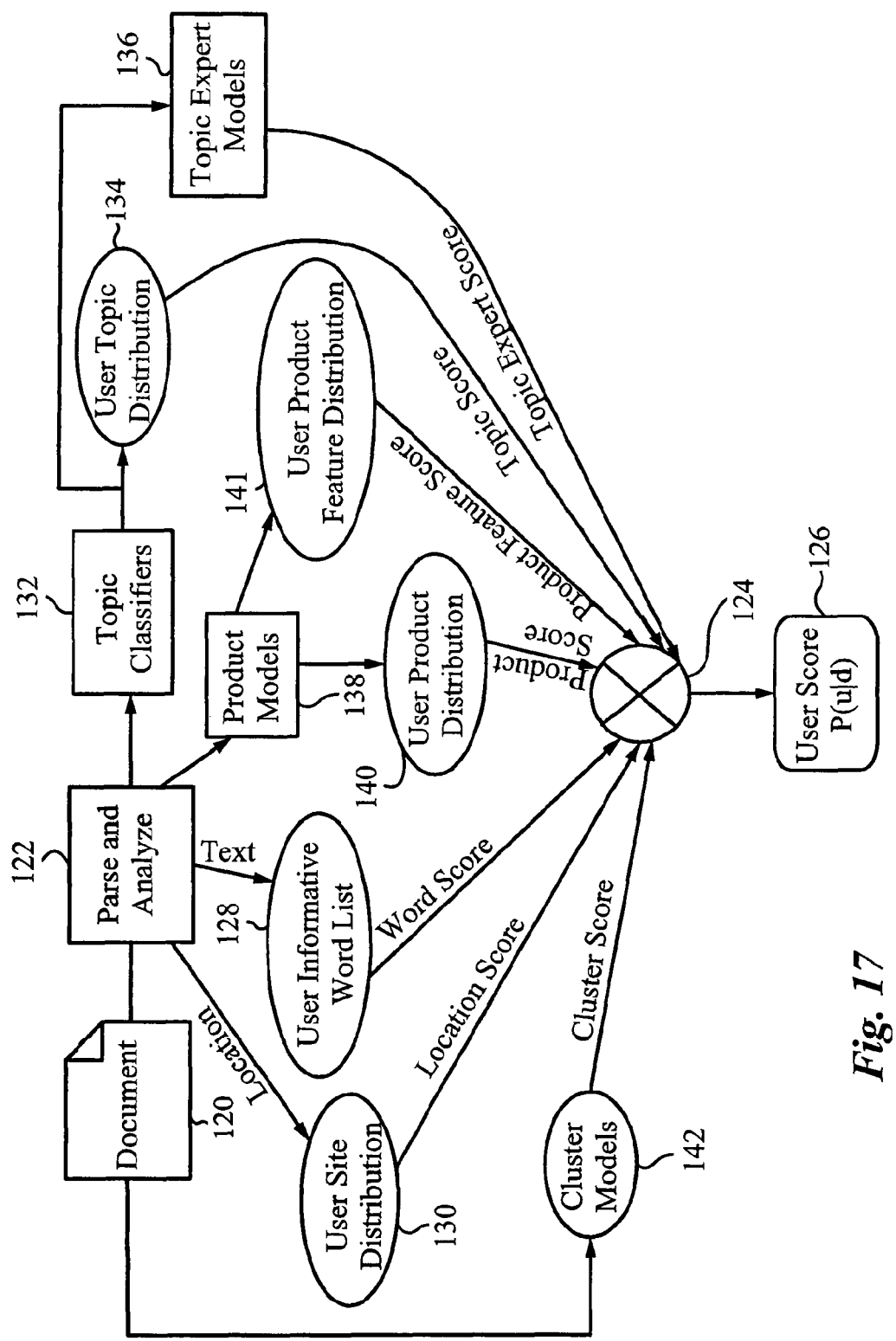
FIG. 17 is a schematic diagram of the method of applying the User Model to new documents to estimate the probability of user interest in the document.

The process of estimating user interest in a particular unseen document 120 is illustrated in FIG. 17. This process has the following three steps:
1. Preprocessing the document as for initialization (step 122).
2. Calculating an individual score for the document for each element of the user representation (e.g., topic distribution, word list).
3. Non-linearly combining (124) individual scores into one score 126, the probability that the user is interested in the unseen document, P(u|d).

The second step varies for each individual score. From the parsed text, the words of the document 120 are intersected with the words or phrases in the user informative word list 128. For every word or phrase in common, the stored mutual information between the two indicator variables $I_w$, and $I_u$, is summed to obtain the word score. Alternatively, the TFIDF associated with the word are averaged for every common word or phrase. The location score is given by the probability that the document site is of interest to the user, based on the user site distribution 130.

The topic classifiers 132 are applied to document 120 to determine the probability that the document relates to a particular topic, P(t|d). The user topic score is obtained by computing the relative entropy between the topic distribution P(t|d) and the user topic distribution 134, P (t|u). After the document has been classified into topics, the topic expert models 136 are applied as described above to determine a score reflecting the interest of users that are experts in the particular topics of this document.

Similarly, the product models 138 are applied to document 120 to determine which products or product categories it describes, P(p|d). From the document product distribution, the product score is obtained by computing the relative entropy between the document product distribution and user product distribution 140, P(p|u). For each product having a nonzero value of P(p|d), its feature values are given by the product model. The user's measures on each of these feature values, found in the user product feature distribution 141, are averaged to obtain a product feature score for each relevant product. Product feature scores are then averaged to obtain an overall product feature score.

The cluster models 142 of clusters to which the user belongs are applied to the document to obtain P(c(u)|d). This group model represents the average interests of all users in the cluster. Conceptually, the cluster model is obtained from the union of all the member users' documents and product purchases. Practically, the cluster model is computed from the User Models by averaging the different distributions of the individual User Models, and not from the documents or purchases themselves. Note that in a recursive way, all users have some impact (relative to their similarity to the user under discussion) on the user score, given that P(c(u)|d)) is estimated using P(c(c(u))|d) as a knowledge source, and so on.

Finally, world knowledge (not shown) is an additional knowledge source that represents the interest of an average user in the document based only on a set of predefined factors. World knowledge factors include facts or knowledge about the document, such as links pointing to and from the document or metadata about the document, for example, its author, publisher, time of publication, age, or language. Also included may be the number of users who have accessed the document, saved it in a favorites list, or been previously interested in the document. World knowledge is represented as a probability between 0 and 1.

In step 124, all individual scores are combined to obtain a composite user score 126 for document 120. Step 124 may be performed by training a Multilayer Perceptron using jack-knifing and cross-validation techniques, as described in H. Bourlard and N. Morgan, *Connectionist Speech Recognition: A Hybrid Approach*, Kluwer Academic Publishers, 1994. It has been shown in J. Hertz et al., *Introduction to The Theory of Neural Computation*", Addison-Wesley, 1991, that a Multilayer Perceptron can be trained to estimate posterior probabilities.

The context of a user's interaction can be explicitly represented in calculating the user interest in a document. It is not feasible to update the user model after every newly viewed document or search, but the User Model can be updated effectively instantaneously by incorporating the context of user interactions. Context includes content and location of documents viewed during the current interaction session. For example, if the user visits ten consecutive sites pertaining to computer security, then when the User Model estimates the interest of the user in a document about computer security, it is higher than average. The probability of user interest in a document within the current context con is given by:

$$P(u \mid d, con) = \frac{P(u, con \mid d)}{P(con \mid d)}$$

In some applications, individual scores that are combined in step 124 are themselves useful. In particular, the probability that a user is interested in a given product can be used to suggest product purchases to a user. If a user has previously purchased a product, then the User Model contains a distribution on the product's features. If these features propagate far up the product tree, then they can be used to estimate the probability that the user is interested in a different type of product characterized by similar features. For example, if the user purchases a digital camera that is Windows compatible, then the high probability of this compatibility feature value propagates up the tree to a higher node. Clearly, all computer-related purchases for this user should be Windows compatible. Every product that is a descendent of the node to which the value propagated can be rated based on its compatibility, and Windows-compatible products have a higher probability of being of interest to the user.

The long-term interest of a user in products, represented by P(p|u), is distinct from the user's immediate interest in a product p, represented as P(u|d, product described=p). The user's immediate interest is the value used to recommend products to a user. Note that P(p|u) does not incorporate the user's distribution on feature values. For example, consider the problem of evaluating a user's interest in a particular camera, the Nikon 320. The user has never read any documents describing the Nikon 320, and so P(Nikon 320|u)=0. However, the user's feature distribution for the Cameras node indicates high user interest in all of the feature values characterizing the Nikon 320.

When a given product is evaluated by the User Model, the following measures are combined to obtain P(u|d, product described=p): the probabilities of the product and its ancestor nodes from the user product distribution, P(p|u); an average of probabilities of each feature value from the user product feature distribution, P(f|u,p); a probability from the user's clusters' product distributions, P(p|c(u)); and an average of probabilities of feature values from the cluster' product feature distributions, P(f|c(u),p). The overall product score is determined by non-linearly combining all measures. The cluster model is particularly useful if the user does not have a feature value distribution on products in which the user's interest is being estimated.

Applications

The basic function of estimating the probability that a user is interested in a document or product is exploited to provide different types of personalized services to the user. In each type of service, the user's response to the service provided is monitored to obtain positive and negative examples that are used to update the User Model. Example applications are detailed below. However, it is to be understood that all applications employing a trainable User Model as described above are within the scope of the present invention.

Personal Search

In this application, both the collection and filtering steps of searching are personalized. A set of documents of interest to the user is collected, and then used as part of the domain for subsequent searches. The collected documents may also be used as part of the user documents to update the User Model. The collection step, referred to as Personal Crawler, is illustrated schematically in FIG. 18. A stack 170 is initialized with documents of high interest to the user, such as documents in the bookmarks file or documents specified by the user. If necessary, the stack documents may be selected by rating each document in the general document index according to the User Model. The term "stack" refers to a pushdown stack as described in detail in R. Sedgewick, *Algorithms in C++*, Parts 1-4, Addison-Wesley, 1998.

In step 172, the crawler selects a document from the top of the stack to begin crawling. The document is parsed and analyzed (step 174) to identify any links to other documents. If there are links to other documents, each linked document is scored using the User Model (176). If the linked document is of interest to the user (178), i.e., if P(u|d) exceeds a threshold level, then it is added to the stack in step 180, and the crawler continues crawling from the linked document (step 172). If the document is not of interest to the user, then the crawler selects the next document on the stack to continue crawling.

Figure 19:
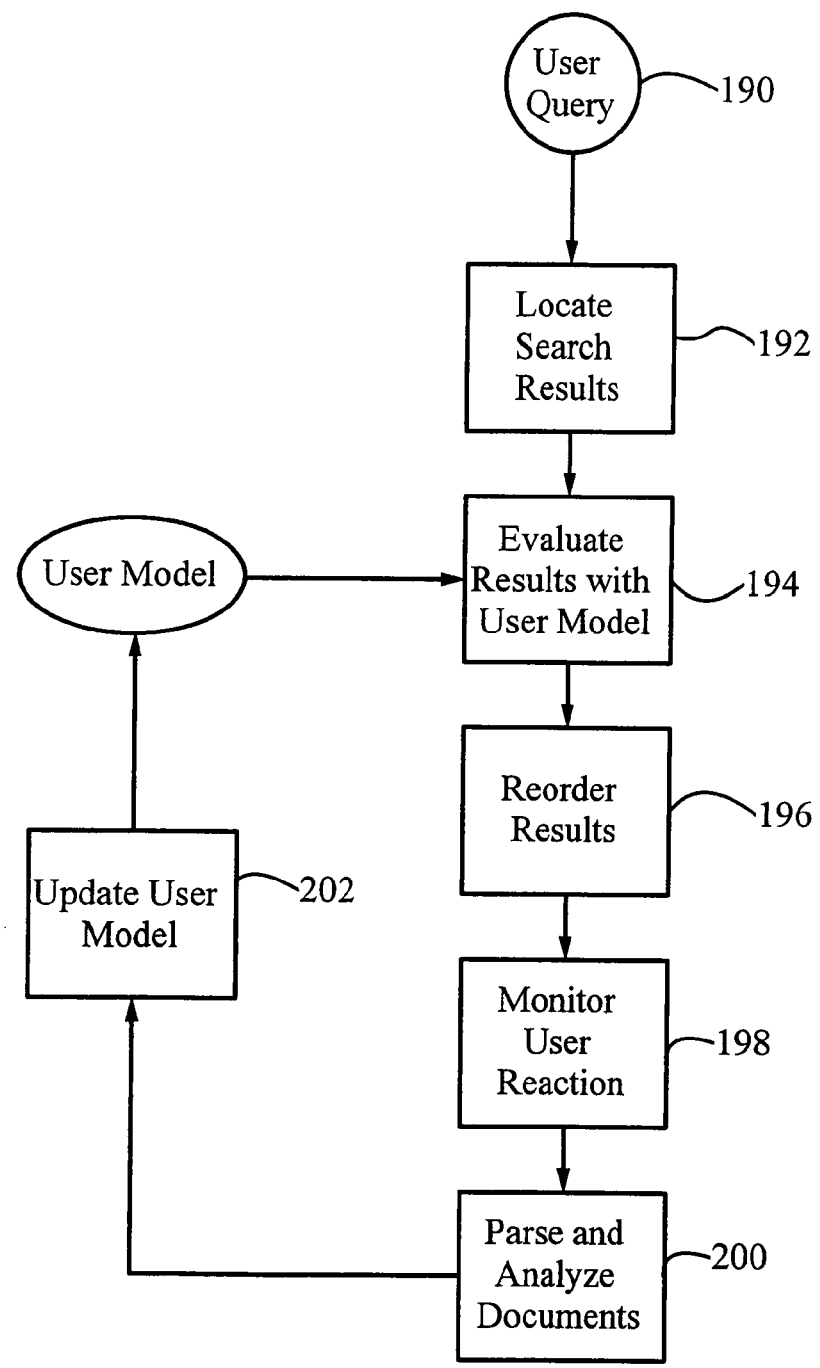
FIG. 19 is a block diagram of the personal search application of the present invention.

The subsequent searching step is illustrated in FIG. 19. In response to a query 190, a set of search results is located from the set containing all documents D and user documents obtained during personal crawling. The results are evaluated using the User Model (194) and sorted in order of user interest (196), so that the most interesting documents are listed first. The user reaction to each document in the search results is monitored. Monitored reactions include whether or not a document was viewed or ignored and the time spent viewing the document. Documents to which the user responds positively are parsed and analyzed (200) and then used to update the User Model (202) as described above.

The role of the User Model in filtering the search results in step 194 is based on Bayesian statistics and pattern classification theory. According to pattern classification theory, as detailed in R. Duda and P. Hart, *Pattern Classification and*

*Scene Analysis*, Wiley, 1973, the optimal search result is the one with the highest posterior probability. That is, the optimal result is given by:

$$\underset{D}{\operatorname{Max}} P(u \mid q, d),$$

where P(u|q,d) is the posterior probability of the event that a document d is of interest to a user u having an information need q. This probability can be expressed as:

$$P(u \mid q, d) = \frac{P(q \mid d, u) P(u \mid d)}{P(q \mid d)}.$$

The term P(u|d) represents the user interest in the document regardless of the current information need, and is calculated using the User Model. The term P(q|d,u) represents the probability that a user u with an information need of d expresses it in the form of a query q. The term P(q|d) represents the probability that an average user with an information need of d expresses it in the form of a query q. One possible implementation of the latter two terms uses the Hidden Markov Model, described in Christopher D. Manning and Hinrich Schutze, *Foundations of Statistical Natural Language Processing*, MIT Press, 1999.

Search results may also be filtered taking into account the context of user interactions, such as content of a recently viewed page or pages. When the context is included, the relevant equation is:

$$P(u \mid q, d, con) = \frac{P(q \mid d, u, con) P(u \mid d, con)}{P(q \mid d, con)}$$

where P(u|d,con) is as described above.

The Personal Crawler is also used to collect and index documents for product models. Collected documents are parsed and analyzed to update product models, particularly the list of product feature values, which are extracted from collected documents using information extraction techniques.

In general, searches are performed to retrieve all documents from the set of indexed documents that match the search query. Alternatively, searches can be limited to product-related documents, based on either the user's request, the particular search query, or the user's context. For example, a user is interested in purchasing a new bicycle. In one embodiment, the user selects a check-box or other graphical device to indicate that only product-related documents should be retrieved. When the box is not checked, a search query "bicycle" returns sites of bicycle clubs and newsletters. When the box is checked, only documents that have a nonzero product probability (P(p|d)) on specific products are returned. Such documents include product pages from web sites of bicycle manufacturers, product reviews, and discussion group entries evaluating specific bicycle models.

Alternatively, the search query itself is used to determine the type of pages to return. For example, a query "bicycle" again returns sites of bicycle clubs and newsletters. However, a query "cannondale bicycle" or "cannondale" returns only product-related pages for Cannondale bicycles. Alternatively, the user's context is used to determine the type of pages to return. If the last ten pages viewed by the user are product-related pages discussing Cannondale bicycles, then the query "bicycle" returns product-related pages for all brands of bicycles that are of interest to the user, as determined by the User Model. In all three possible embodiments, within the allowable subset of documents, the entire document is evaluated by the User Model to estimate the probability that the user is interested in the document.

Searches may also be performed for products directly, and not for product-related documents. Results are evaluated using only the user product distribution, user product feature distribution, and product and feature distributions of the user's clusters, as explained above. In general, product searches are performed only at the request of the user, for example by selecting a "product search" tab using a mouse or other input device. A user enters a product category and particular feature values, and a list of products that are estimated to be of high interest to the user is returned. The user is returned some form of list of most interesting products. The list may contain only the product name, and may include descriptions, links to relevant documents, images, or any other appropriate information.

Personal Browsing and Navigation

The present invention personalizes browsing and navigation in a variety of different ways. In the personal web sites application, web sites located on third party servers are written in a script language that enables dynamic tailoring of the site to the user interests. Parameters of the User Model are transferred to the site when a user requests a particular page, and only selected content or links are displayed to the user. In one embodiment, the site has different content possibilities, and each possibility is evaluated by the User Model. For example, the CNN home page includes several potential lead articles, and only the one that is most interesting to the user is displayed. In a second embodiment, links on a page are shown only if the page to which they link is of interest to the user. For example, following the lead article on the CNN home page are links to related articles, and only those of interest to the user are shown or highlighted. One single article has a variety of potential related articles; a story on the Microsoft trial, for example, has related articles exploring legal, technical, and financial ramifications, and only those meeting the user's information needs are displayed.

Figure 20:
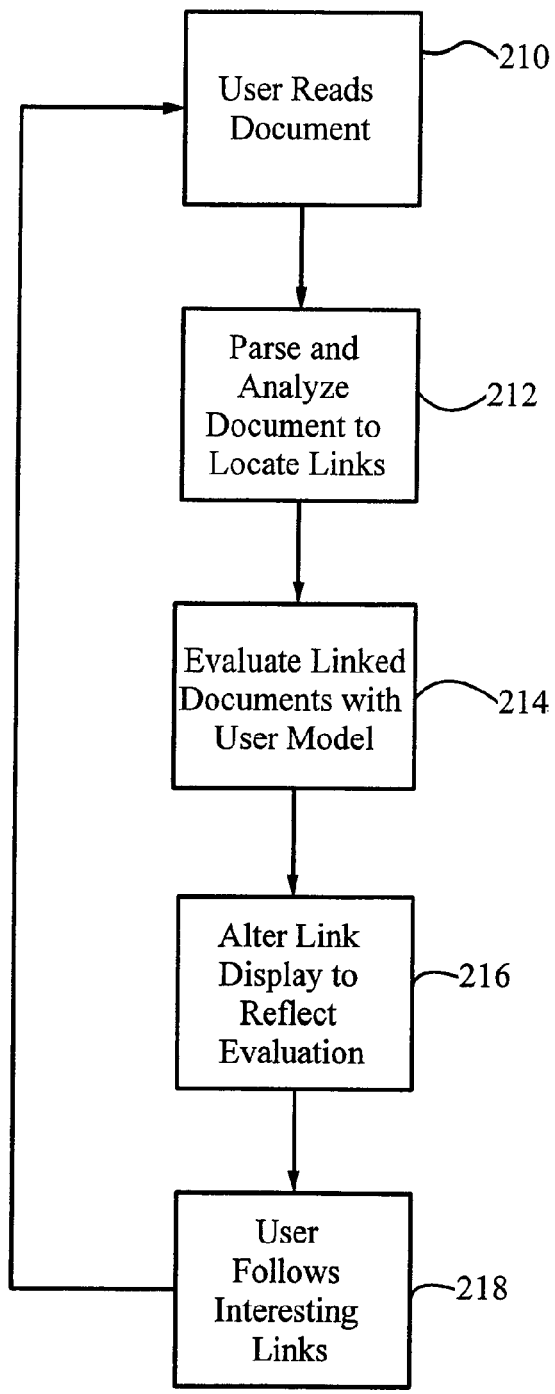
FIG. 20 is a block diagram of the personal navigation application of the present invention.

The personal links application is illustrated in FIG. 20. In this application, the hyperlinks in a document being viewed by the user are graphically altered, e.g., in their color, to indicate the degree of interest of the linked documents to the use. As a user views a document (step 210), the document is parsed and analyzed (212) to locate hyperlinks to other documents. The linked documents are located in step 214 (but not shown to the user), and evaluated with the User Model (214) to estimate the user's interest in each of the linked documents. In step 216, the graphical representation of the linked documents is altered in accordance with the score computed with the User Model. For example, the links may be color coded, with red links being most interesting and blue links being least interesting, changed in size, with large links being most interesting, or changed in transparency, with uninteresting links being faded. If the user follows one of the interesting links (218), then the process is repeated for the newly viewed document (210).

The personal related pages application locates pages related to a viewed page. Upon the user's request (e.g., by clicking a button with a mouse pointer), the related pages are displayed. Related pages are selected from the set of user documents collected by the personal crawler. Implementation is similar to that of the personal search application, with the viewed page serving as the query. Thus the relevant equation becomes $$P(u|page,d)=P(page|d,u)P(u|d),$$

$$P(page|d)$$

with P(page|d,u) representing the probability that a user u with an information need of document d expresses it in the form of the viewed page. P(page|d) represents the probability that an average user with an information need of document d expresses it in the form of the viewed page. These terms can be calculated using the Hidden Markov Model.

Alternatively, related pages or sites may be selected according to the cluster model of clusters to which the user belongs. The most likely site navigation from the viewed site, based on the behavior of the cluster members, is displayed to user upon request.

Related pages are particularly useful in satisfying product information needs. For example, if the user is viewing a product page of a specific printer on the manufacturer's web site, clicking the "related pages" button returns pages comparing this printer to other printers, relevant newsgroup discussions, or pages of comparable printers of different manufacturers. All returned related pages have been evaluated by the User Model to be of interest to the user.

Find the Experts

In this application, expert users are located who meet a particular information or product need of the user. Expert users are users whose User Model indicates a high degree of interest in the information need of the user. The information need is expressed as a document or product that the user identifies as representing his or her need. In this context, a document may be a full document, a document excerpt, including paragraphs, phrases, or words, the top result of a search based on a user query, or an email message requesting help with a particular subject. From the pool of potential experts, User Models are applied to the document or product, and users whose probability of interest in the document or product exceeds a threshold level are considered expert users.

The pool of experts is specified either by the user or in the system. For example, the pool may include all company employees or users who have previously agreed to help and advise other users. When users request expert advice about a particular product, the expert may be chosen from the product manufacturer or from users who have previously purchased the product, or from users participating in discussion groups about the product.

A protocol for linking users and identified experts is determined. For example, the expert receives an email message requesting that he or she contact the user in need of assistance. Alternatively, all user needs are organized in a taxonomy of advice topics, and an expert searches for requests associated with his or her topic of expertise.

Personal News

Figure 18:
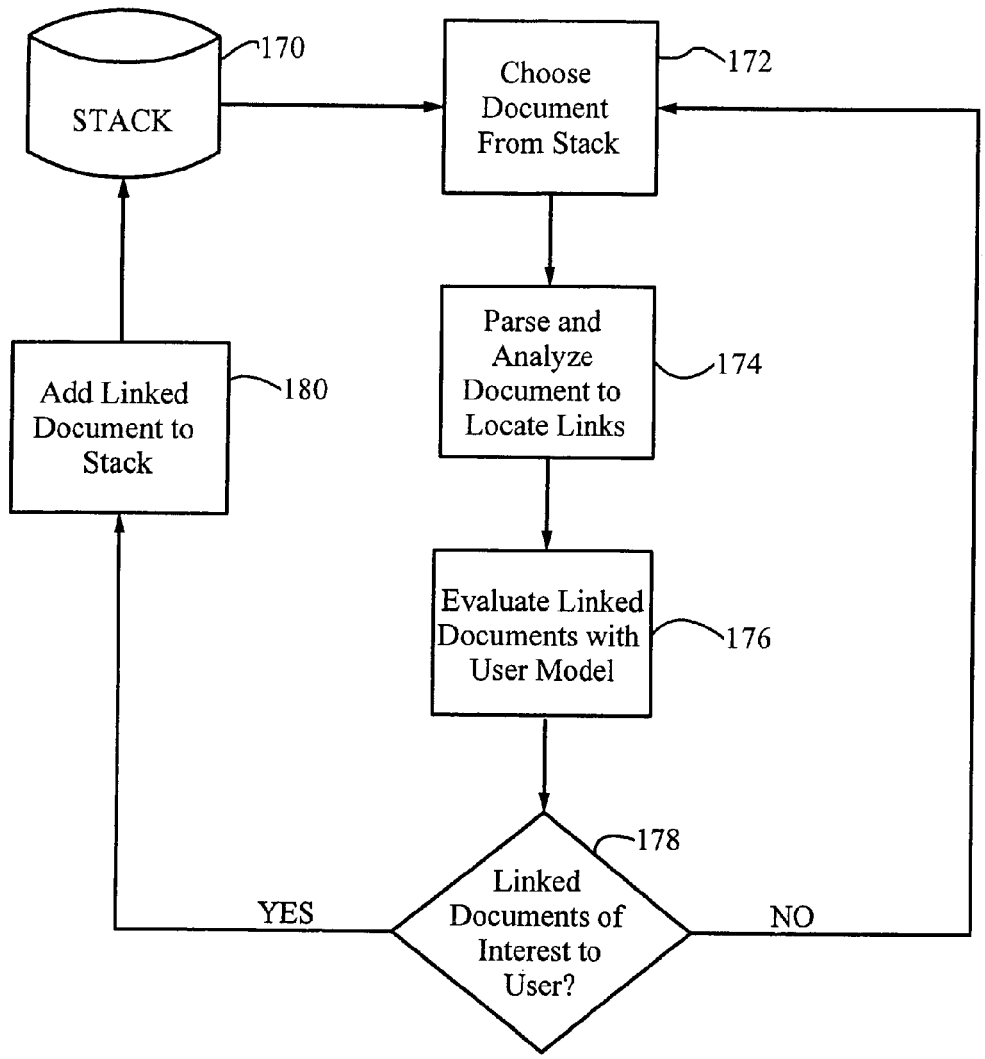
FIG. 18 is a block diagram of the personal crawler application of the present invention.

This application, also known as personal pushed information, uses the personal crawler illustrated in FIG. 18. From all documents collected within a recent time period by the user's crawler or user's clusters' crawlers, the most interesting ones are chosen according to the User Model. Collection sources may also be documents obtained from news wires of actions of other users. Documents are sent to the user in any suitable manner. For example, users receive email messages containing URLs of interesting pages, or links are displayed on a personal web page that the user visits.

Personalization Assistant

Using the User Model, the Personalization Assistant can transform any services available on the web into personalized services, such as shopping assistants, chatting browsers, or matchmaking assistants.

Document Barometer

Figure 21:
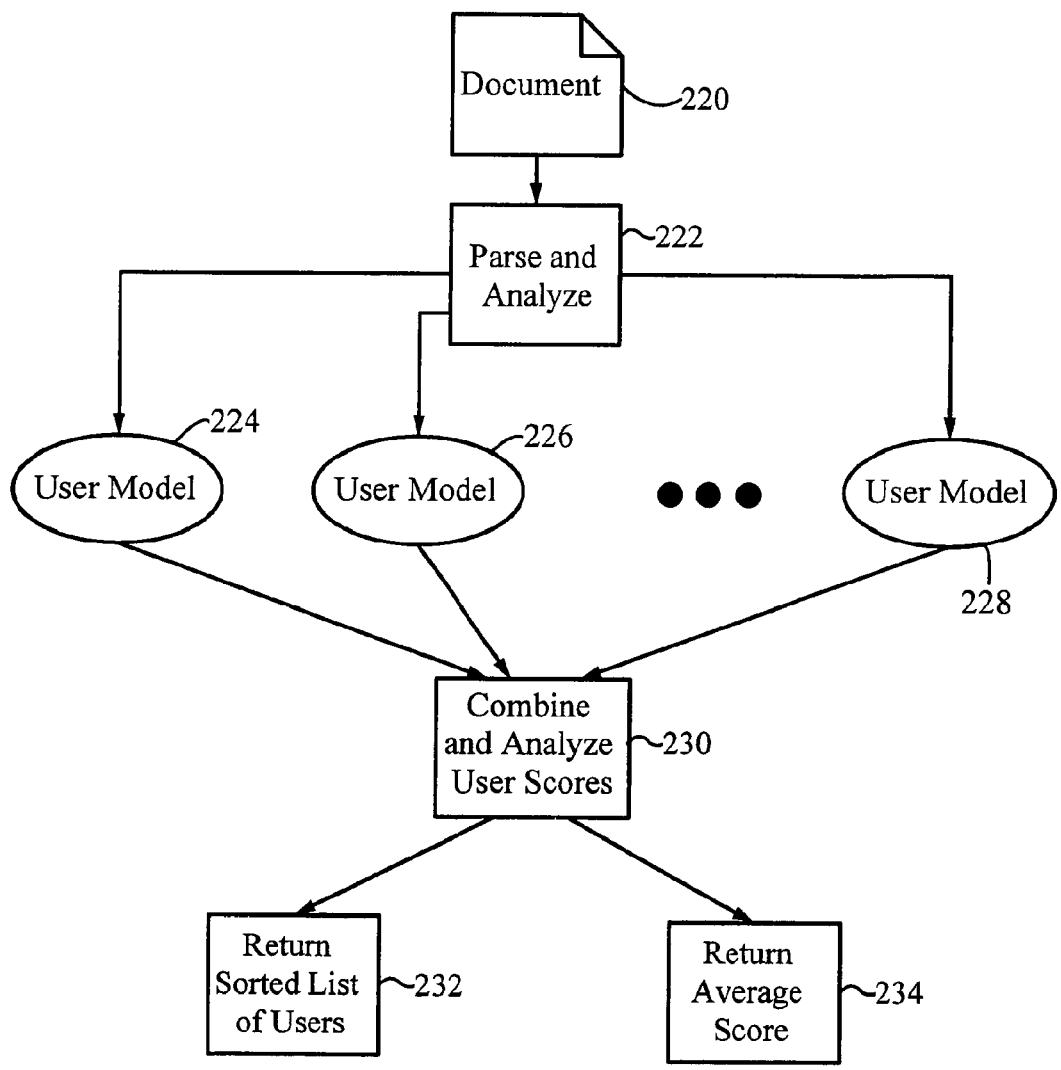
FIG. 21 is a block diagram of the document barometer application of the present invention.

The document barometer, or Page-O-Meter, application, illustrated in FIG. 21, finds the average interest of a large group of users in a document. The barometer can be used by third parties, such as marketing or public relations groups, to analyze the interest of user groups in sets of documents, advertising, or sites, and then modify the documents or target advertising at particular user groups. The application can instead report a score for a single user's interest in a document, allowing the user to determine whether the system is properly evaluating his or her interest. If not, the user can make user modification requests for individual elements of the User Model. From individual and average scores, the application determines a specific user or users interested in the document.

Referring to FIG. 21, a document 220 is parsed and analyzed (222) and then evaluated according to a set of N User Models 224 and 226 through 228. N includes any number greater than or equal to one. The resulting scores from all User Models are combined and analyzed in step 230. In one embodiment, the analysis locates users having maximum interest in document 220, or interest above a threshold level, and returns a sorted list of interested users (232). Alternatively, an average score for document 220 is calculated and returned (234). The average score may be for all users or for users whose interest exceeds a threshold interest level. The range of interest levels among all users in the group may also be reported.

An analogous product barometer calculates user interest in a product. The product barometer computes a score for an individual user or group of users, or identifies users having an interest in a product that exceeds a threshold level. Third party organizations use the product barometer to target marketing efforts to users who are highly likely to be interested in particular products.

3D Map

Figure 22:
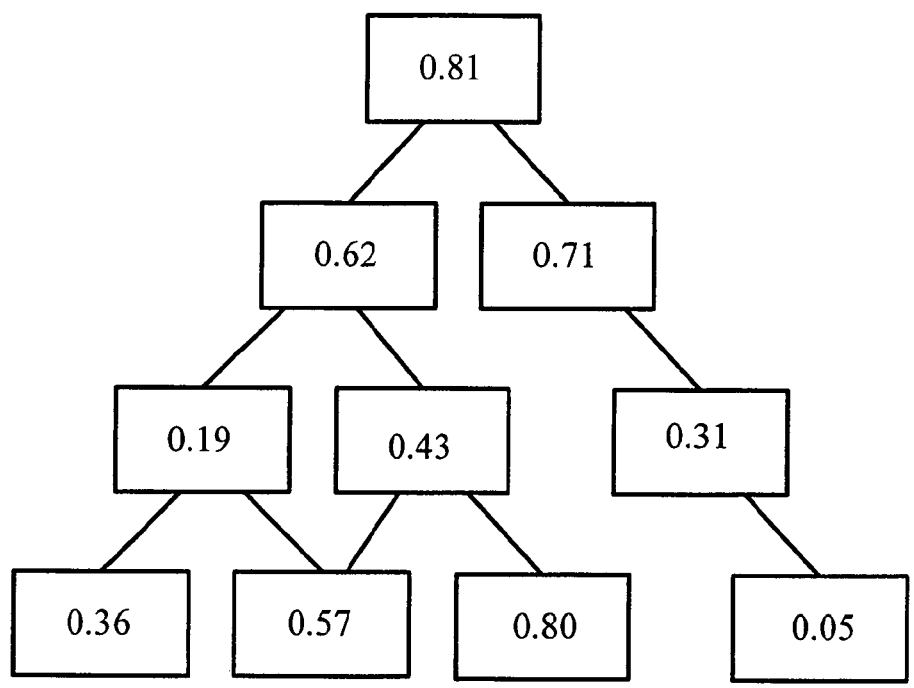
FIG. 22 is a schematic diagram of the three-dimensional map application of the present invention.

FIG. 22 illustrates a three-dimensional (3D) map 240 of the present invention, in which rectangles represent documents and lines represent hyperlinks between documents. A user provides a set of hyperlinked documents, and each document is scored according to the User Model. An image of 3D map 240 is returned to the user. 3D map 240 contains, for each document, a score reflecting the probability of interest of the user in the document.

Product Recommendations

A user's online shopping experience can be personalized by making use of the user's overall product score described above, P(u|d, product described=p). Products that are of high interest to the user are suggested to him or her for purchase. When a user requests information for a specific product or purchases a product, related products are suggested (up-sell). Related product categories are predetermined by a human, but individual products within related categories are evaluated by the User Model before being suggested to the user. The related products are given to the user in a list that may contain images, hyperlinks to documents, or any other suitable information. For example, when a user purchases a server, a list of relevant backup tapes are suggested to him or her for purchase. Suggested products may have feature values that are known to be of interest to the user, or may have been purchased by other members of the user's cluster who also purchased the server. Related product suggestions may be made at any time, not only when a user purchases or requests information about a particular product. Suggested products may be related to any previously purchased products.

Similarly, competing or comparable products are suggested to the user (cross-sell). When the user browses pages of a particular product, or begins to purchase a product, products within the same product category are evaluated to estimate the user's interest in them. Products that are highly interesting to the user are recommended. The user might intend to purchase one product, but be shown products that are more useful or interesting to him or her.

It will be clear to one skilled in the art that the above embodiments may be altered in many ways without departing from the scope of the invention. Accordingly, the scope of the invention should be determined by the following claims and their legal equivalents.

What is claimed is:

1. A computer-implemented method for providing automatic, personalized information services to a user u, the method comprising:
    a) transparently monitoring user interactions with data while the user is engaged in normal use of a computer;
    b) updating user-specific data files, wherein the user-specific data files comprise the monitored user interactions with the data and a set of documents associated with the user;
    c) estimating parameters of a learning machine, wherein the parameters define a User Model specific to the user and wherein the parameters are estimated in part from the user-specific data files;
    d) analyzing a document d to identify properties of the document, the properties including (a) words of the document and (b) at least one additional property, the words of the document having (i) a first word frequency within the document and (ii) a second word frequency within other documents;
    e) estimating a probability $P(u|d)$ that an unseen document d is of interest to the user u, wherein the probability $P(u|d)$ is estimated by applying the identified properties of the document to the learning machine having the parameters defined by the User Model; and
    f) using the estimated probability to provide automatic, personalized information services to the user.

2. The method of claim 1 wherein the user-specific data files include documents of interest to the user u and documents that are not of interest to the user u, and wherein estimating the parameters comprises distinct treatment of the documents of interest and the documents that are not of interest.

3. The method of claim 1 wherein analyzing the document d provides for the analysis of documents having multiple distinct media types.

4. The method of claim 1 wherein transparently monitoring user interactions with data comprises monitoring multiple distinct modes of user interaction with network data.

5. The method of claim 4 wherein the multiple distinct modes of user interaction comprise a mode selected from the group consisting of a network searching mode, a network navigation mode, a network browsing mode, an email reading mode, an email writing mode, a document writing mode, a viewing "pushed" information mode, a finding expert advice mode, and a product purchasing mode.

6. The method of claim 1 wherein the identified properties of the document d comprise a user u-independent property selected from the group consisting of:
    a) a probability $P(t,d)$ that the document d is of interest to users interested in a topic t;
    b) a topic classifier discrete probability distribution $P(t|d)$;
    c) a product model discrete probability distribution $P(p|d)$;
    d) product feature values extracted from the document d;
    e) an author of the document d;
    f) an age of the document d;
    g) a list of documents linked to the document d;
    h) a language of the document d;
    i) a number of users who have accessed the document d;
    j) a number of users who have saved the document d in a favorite document list; and
    k) a list of users previously interested in the document d.

7. The method of claim 1 wherein the parameters of the learning machine define a user u-dependent function selected from the group consisting of:
    a) a user topic probability distribution $P(t|u)$ representing interests of the user u in various topics t;
    b) a user product probability distribution $P(p|u)$ representing interests of the user u in various products p;
    c) a user product feature probability distribution $P(f|u,p)$ representing interests of the user u in various features f of each of the various products p;
    d) a web site probability distribution $P(s|u)$ representing interests of the user u in various web sites s;
    e) a cluster probability distribution $P(c(u)|u)$ representing similarity of the user u to users in various clusters $c(u)$;
    f) a phrase model probability distribution $P(w|u)$ representing interests of the user u in various phrases w;
    g) an information theory based measure $I(I_w; I_u)$ representing mutual information between various phrases w and the user u;
    h) an information theory based measure $I(I_t; I_u)$ representing mutual information between various topics t and the user u;
    i) an information theory based measure $I(I_s; I_u)$ representing mutual information between various web sites s and the user u;
    j) an information theory based measure $I(I_p; I_u)$ representing mutual information between various products p and the user u; and
    k) an information theory based measure $I(I_f; I_u)$ representing mutual information between various features f of each of the various products p and the user u.

8. The method of claim 1 wherein the parameters of the learning machine define:
    a) a user product probability distribution $P(p|u)$ representing interacts of the user u in various products p; and
    b) a user product feature probability distribution $P(f|u,p)$ representing interests of the user u in various features f of each of the various products p; and
    wherein the method further comprises estimating a probability $P(u|d,\text{product described}=p)$ that a document d that describes a product p is of interest to the user u, wherein the probability is estimated in part from the user product probability distribution and the user product feature probability distribution.

9. The method of claim 1 further comprising estimating a posterior probability $P(u|d,q)$ that the document d is of interest to the user u, given a query q submitted by the user.

10. The method of claim 9 wherein estimating the posterior probability comprises estimating a probability $P(q|d,u)$ that the query q is expressed by the user u with an information need in the document d.

11. The method of claim 1 further comprising parsing the document d for hyperlinks, and separately estimating for each of the hyperlinks a probability that the hyperlink is of interest to the user u.

12. The method of claim 1 further comprising sending to a third party web server user interest information derived from the User Model, whereby the third party web server may customize its interaction with the user.

13. The method of claim 1 wherein the monitored user interactions include a sequence of interaction times.

14. The method of claim 1 further comprising initializing the User Model using information selected from the group consisting of a set of documents provided by the user, a web browser history file associated with the user, a web browser bookmarks file associated with the user, ratings by the user of a set of documents, and previous product purchases made by the user.

15. The method of claim 1 further comprising providing to the user a score for a document identified by the user, wherein the score is derived from the estimated probability.

16. The method of claim 1 further comprising temporarily using a User Model that is built from a set of predetermined parameters of a profile selected by the user.

17. The method of claim 1 further comprising initializing the User Model by selecting a set of predetermined parameters of a prototype user selected by the user.

18. The method of claim 1 further comprising identifying a set of users interested in the document d.

19. A program storage device accessible by a central computer, tangibly embodying a program of instructions executable by the central computer to perform method steps for providing automatic, personalized information services to a user u, the method steps comprising:

a) transparently monitoring user interactions with data while the user is engaged in normal use of a client computer in communication with the central computer;
b) updating user-specific data files, wherein the user-specific data files comprise the monitored user interactions with the data and a set of documents associated with the user;
c) estimating parameters of a learning machine, wherein the parameters define a User Model specific to the user and wherein the parameters are estimated in part from the user-specific data files;
d) analyzing a document d to identify properties of the document, the properties including (a) words of the document and (b) at least one additional property, the words of the document having (i) a first word frequency within the document and (ii) a second word frequency within other documents;
e) estimating a probability $P(u|d)$ that an unseen document d is of interest to the user u, wherein the probability $P(u|d)$ is estimated by applying the identified properties of the document to the learning machine having the parameters defined by the User Model; and
f) using the estimated probability to provide automatic, personalized information services to the user.

* * * * *

UNITED STATES PATENT AND TRADEMARK OFFICE
CERTIFICATE OF CORRECTION

PATENT NO.       : 8,825,853 B1
APPLICATION NO.  : 13/907115
DATED            : September 2, 2014
INVENTOR(S)      : Konig et al.

It is certified that error appears in the above-identified patent and that said Letters Patent is hereby corrected as shown below:

On the Title Page,

On page 4, in column 1, under "Other Publications", line 50, delete "Pum's" and insert --PUM's--, therefor On page 5, in column 2, under "Other Publications", line 15, delete "Owner'S" and insert --Owner's--, therefor In the Specification, In column 12, line 3, delete "$P(i_{,w},i_u)$" and insert --$P(i_w,i_u)$--, therefor In column 12, line 12 (approx.), delete "betweenthe" and insert --between the--, therefor In column 19, line 45 (approx.), delete "$\text{Distance}(u_1,u_2)=\Sigma_{d_j \epsilon D_{sample}} D'(I_{u1,d_j} \| I_{u^2,d_j})$." and insert -- $$\text{Distance}(u_1,u_2) = \sum_{d_j \in D_{sample}} D'\left(I_{u1,d_j} \middle\| I_{u2,d_j}\right).$$ --, therefor In column 19, line 62, delete "members'User" and insert --members' User--, therefor In column 24, line 41, delete "P (t|u)" and insert --P(t|u)--, therefor Signed and Sealed this
Fourteenth Day of April, 2015

Michelle K. Lee
*Director of the United States Patent and Trademark Office*

CERTIFICATE OF CORRECTION (continued)
U.S. Pat. No. 8,825,853 B1

$$P(u|\text{page},d)=P(\text{page}|d,u)P(u|d),$$

In column 29, line 4-8 (approx.), delete "$P(\text{page}|d)$" and insert -- $P(u|page,d) = \dfrac{P(page|d,u)P(u|d)}{P(page|d)}.$ --, therefor In the Claims, In column 31, line 65, in Claim 6, delete "P(t,d)" and insert --P(t|d)--, therefor In column 32, line 45, in Claim 8, delete "interacts" and insert --interests--, therefor